United States Patent
Bojoi et al.

(10) Patent No.: US 12,407,230 B2
(45) Date of Patent: Sep. 2, 2025

(54) SYSTEM AND METHOD FOR PERMANENT MAGNET ASSISTED SYNCHRONOUS RELUCTANCE MOTOR CONTROL FROM ZERO OR LOW SPEED

(71) Applicant: Wolong Electric Group Co. Ltd., Zhejiang (CN)

(72) Inventors: Radu Bojoi, Turin (IT); Zheng Zhang, Saint Joseph, MI (US); Dingsheng Lin, Venetia, PA (US); Song Chi, Cary, NC (US); Liyang Sun, Shaoxing (CN); Weican Yan, Shaoxing (CN)

(73) Assignee: Wolong Electric Group Co. Ltd., Shaoxing (CN)

( * ) Notice: Subject to any disclaimer, the term of this patent is extended or adjusted under 35 U.S.C. 154(b) by 88 days.

(21) Appl. No.: 18/403,895

(22) Filed: Jan. 4, 2024

(65) Prior Publication Data
US 2025/0062668 A1    Feb. 20, 2025

Related U.S. Application Data

(63) Continuation of application No. 18/234,000, filed on Aug. 15, 2023, now Pat. No. 11,894,740.

(51) Int. Cl.
*H02K 21/38* (2006.01)
*H02K 11/30* (2016.01)
(Continued)

(52) U.S. Cl.
CPC ............ *H02K 21/38* (2013.01); *H02K 11/30* (2016.01); *H02P 21/14* (2013.01); *H02P 21/34* (2016.02);
(Continued)

(58) Field of Classification Search
CPC ........ H02K 11/30; H02K 11/33; H02K 21/12; H02K 21/38; H02P 21/14; H02P 21/34;
(Continued)

(56) References Cited

U.S. PATENT DOCUMENTS

| 2,746,300 A | 5/1956 | Seaman |
| 10,345,498 B2 | 7/2019 | Zhou et al. |

(Continued)

FOREIGN PATENT DOCUMENTS

| DE | 10 2007 057 499 A1 | 6/2008 |
| EP | 3 514 927 B1 | 12/2023 |

(Continued)

OTHER PUBLICATIONS

Bianchi, N. et al., "Fast synthesis of permanent magnet assisted synchronous reluctance motors", IET Electric Power Applications, Dec. 7, 2015, pp. 1-8.

*Primary Examiner* — Naishadh N Desai
(74) *Attorney, Agent, or Firm* — Warner Norcross + Judd LLP

(57) ABSTRACT

System and method for robust sensorless control of permanent magnet assisted synchronous reluctance (PM-SyR) motor. The system and method includes startup control of a motor with known rotor position/speed, but unknown rotor magnetic polarity of a motor exhibiting rotor magnetic anisotropy or saliency. The system and method includes a rotor characteristic detection method for a PM-SyR motor that detects rotor magnetic polarity based on the variation of the inductance that is caused by the leakage flux paths in the rotor barrier bridges and utilizes the detected rotor magnetic polarity for improved motor startup.

19 Claims, 16 Drawing Sheets

(51) Int. Cl.
　　　*H02P 21/14*　　　(2016.01)
　　　*H02P 21/34*　　　(2016.01)
　　　*H02P 25/089*　　(2016.01)

(52) U.S. Cl.
　　　CPC ........ *H02P 25/089* (2016.02); *H02P 2207/05* (2013.01)

(58) Field of Classification Search
　　　CPC .... H02P 2207/05; H02P 25/08; H02P 25/089; H02P 6/20
　　　See application file for complete search history.

(56) References Cited

U.S. PATENT DOCUMENTS

| | | | |
|---|---|---|---|
| 10,784,805 | B1 | 9/2020 | Bojoi et al. |
| 10,819,264 | B1 * | 10/2020 | Bojoi .................. H02P 21/18 |
| 11,239,772 | B1 * | 2/2022 | Bojoi .................. H02P 21/22 |
| 2006/0279166 | A1 * | 12/2006 | Takeuchi ............. H02K 21/24 |
| | | | 318/599 |
| 2014/0184133 | A1 | 7/2014 | Yuuki et al. |
| 2015/0268283 | A1 | 9/2015 | Mariethoz et al. |

FOREIGN PATENT DOCUMENTS

| | | |
|---|---|---|
| JP | 2017-131000 A | 7/2017 |
| JP | 2021-164192 A | 10/2021 |
| WO | 2021/030900 A1 | 2/2021 |

* cited by examiner

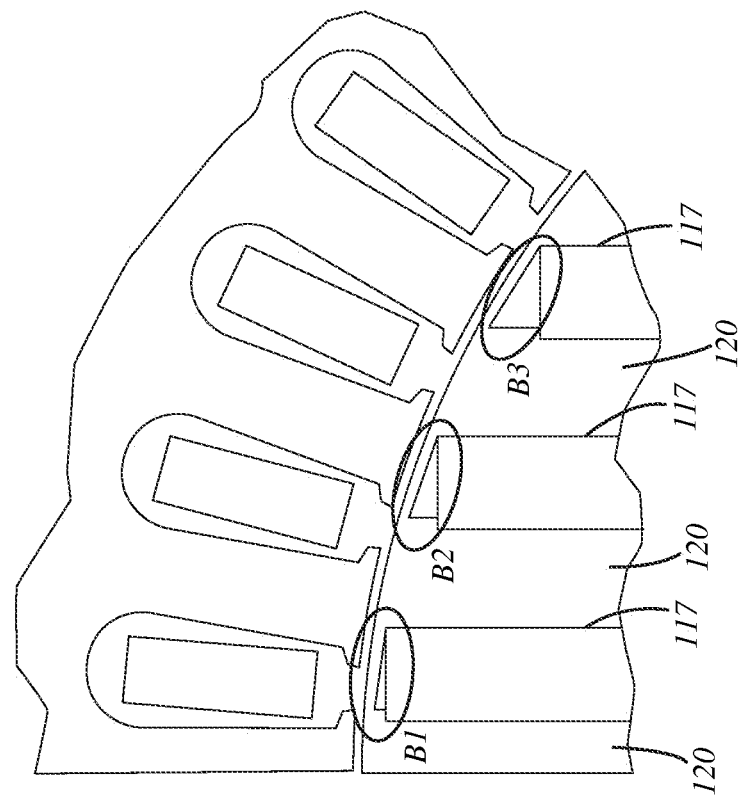
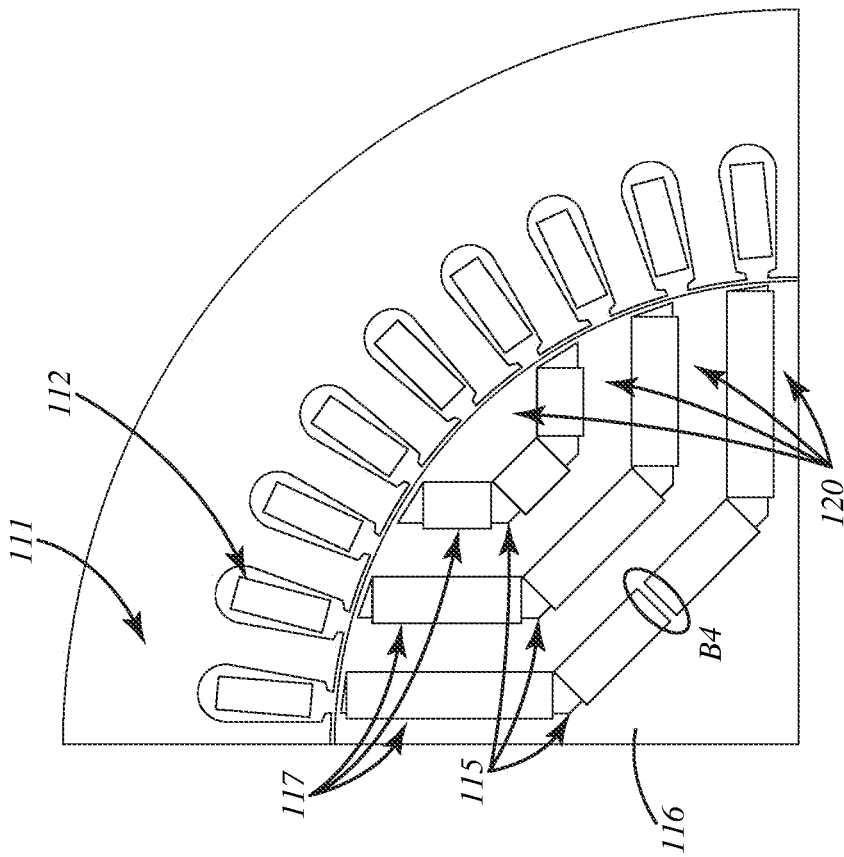
Fig. 11A
Fig. 11B

— FLUX LINKAGE (PICK UP 1) Sb
— FLUX LINKAGE (PICK UP 2) Sb
---- FLUX LINKAGE (PICK UP 3) Sb

SYSTEM AND METHOD FOR PERMANENT MAGNET ASSISTED SYNCHRONOUS RELUCTANCE MOTOR CONTROL FROM ZERO OR LOW SPEED

This invention generally relates to robust control of a permanent magnet assisted synchronous reluctance motor ("PM-SyR"). Various embodiments relate to sensorless robust closed loop control starting at zero or low speed.

Sensorless permanent magnet synchronous motor ("PMSM") systems have begun being deployed into certain fan and blower driven applications, such as heating, ventilation, and cooling ("HVAC") systems as well as various other commercial and industrial motor driven products. A sensorless PMSM (also referred to as a sensorless PMSM system) is one type of advanced Electronically Controlled Motor ("ECM") or ECM system. Sensorless PMSM systems can generally not only deliver high peak efficiency at rated working speeds, but also have a relatively large high-efficiency operational speed range. In addition, sensorless PMSM systems variable speed enables low-capacity operation during off-peak periods, such as nighttime, which can account for meaningful energy savings. In addition, these electronically controlled PMSM systems can also provide opportunities for artificial intelligence control and remote control through a variety of communication technologies, such as cloud communication, to improve operational energy savings, accessibility, monitoring, safety, and reliability.

Modern PMSMs are designed with the magnets buried inside the rotor structure, typically referred to as an interior PMSM, ("IPMSM"). Often IPMSMs use Ned-Fe—B rare earth magnets to deliver high performance with certain electromagnetic, mechanical, and economic benefits. In particular, Ned-Fe—B based IPMSMs can reach certain rates of power density or torque density with a small motor body size under an appropriate cooling system design, which can be helpful in many applications, such as electric vehicles or other applications where smaller motor size provides advantages. Known IPMSM design rules and principles have been widely applied into a variety of applications, such as, industrial drives, electric vehicles motors, and wind turbines generators. These usages have caused a demand surge for Ned-Fe—B magnets. However, due to the limited supply of rare earth magnets, the price of Ned-Fe—B magnets continues to rise, thus increasing costs of IPMSM systems. For this reason, and others, development of new types of motors that can deliver comparable performance at a low cost is desired.

Nowadays, permanent magnet assisted synchronous reluctance (PM-SyR) motors are becoming more attractive and popular due to their performance and low cost. In general, a PM-SyR motor is an electric motor that combines the features of both permanent magnet and synchronous reluctance motors. It has a stator with winding coils that create a rotating magnetic field, and a rotor with salient poles that alternate in a pattern of north and south magnetic poles as well as permanent magnets. The rotor magnetic barriers' shape and the arrangement with the permanent magnets produce a reluctance torque as well as PM flux torque to contribute the motor's output torque. The combination of permanent magnets and the reluctance effect in the rotor creates a motor with high torque density and efficiency. Essentially, PM-SyR motors have evolved from synchronous reluctance motors to provide improved performance, mostly increasing the power factor as well as other performance metrics by inserting the magnets into the rotor magnetic barriers.

Normally low-cost ferrite magnets are used in the motors in designs and manufacturing. Synchronous reluctance motors generally have a relatively large saliency factor $L_q/L_d$, (5-6), and that reluctance torque dominates the total torque production capability in addition to the main flux torque generated by the magnets. On the other hand, due to using ferrite magnets, the main flux may be quite low in comparison with that of Ned-Fe—B rare earth permanent magnet materials.

Overall, since PM-SyR motors are essentially a special type of IPMSM, the control technologies for fan or blower driven applications, such as robust close-loop startup control and robust control under severe working conditions are generally applicable to PM-SyR motors as well. For example, the techniques, methods, and control strategies disclosed in the following U.S. Patents: 1) U.S. Pat. No. 10,784,805B1, entitled SYSTEM AND METHOD FOR INTERIOR PERMANENT MAGNET SYNCHRONOUS MOTOR CONTROL FROM ZERO OR LOW SPEED, granted on Sep. 22, 2020, to Bojoi et al., and 2) U.S. Pat. No. 10,819,264 B1 to Bojoi et al., granted on Oct. 27, 2020, entitled "ROBUST STARTING SYSTEM AND METHOD FOR INTERIOR PERMANENT MAGNET SYNCHRONOUS MOTOR CONTROL", and 3) U.S. Pat. No. 11,239,772 B1 to Bojoi et al., granted on Feb. 1, 2022, entitled "SYSTEMS AND METHODS FOR INTERIOR PERMANENT MAGNET SYNCHRONOUS MOTOR CONTROL", which are all hereby incorporated by reference in their entirety, can generally be applied to PM-SyR motor control. Although IPMSM control methodologies can have application to PM-SyR motors, there is room for improvement to PM-SyR motor control based on its specific characteristics. For example, the present disclosure provides improved motor control for PM-SyR motors during motor startup (i.e., at zero or very low speed), especially for the polarity detection.

As more commercial and industrial fans and blowers are driven by PM-SyR motor systems, for example because of their ability to deliver higher performance with significant cost-savings, there is a need for new control systems and methods specific to PM-SyR motors. For example, there is a need for control strategies that can handle the unique issues of PM-SyR motors at startup (e.g., zero or very low speed) to provide high efficiency and robust speed control of commercial and industrial fan and blower driven applications.

SUMMARY OF THE INVENTION

The present invention provides a system and method for robust sensorless control of permanent magnet assisted synchronous reluctance (PM-SyR) motor. The system and method include startup control of a motor using closed loop control from a standstill condition, including zero motor speed or a low motor speed range. A rotor characteristic detection method includes in accordance with one embodiment of the present disclosure, a signal injection method that can detect certain rotor characteristics, such as rotor position, rotor speed, and rotor magnetic polarity, of a motor exhibiting rotor magnetic anisotropy or saliency.

Due to the unique characteristics of PM-SyR motors, specifically the ferrite PM-SyR motors, conventional IPMSM rotor characteristic detection methods are not accurate. The present disclosure provides an improved rotor characteristic detection method for a PM-SyR motor that can detect the rotor position, rotor speed and rotor magnetic polarity, based on the variation of the inductance that is caused by the leakage flux paths in the rotor barrier bridges.

The inductance variation caused by leakage flux paths in the rotor barrier bridges increases robustness and reliability of polarity detection with low current pulses during the polarity detection process. The flux density in main flux path and in leakage flux paths in motor design affect the characteristics relied upon during polarity detection and also factor into its effectiveness. Polarity detection effectiveness can be validated during a motor design stage as to ensure suitable starting from standstill or low speed range based on initial rotor speed/position determined from, for example, a high frequency injection method.

Due to the low magnetic performance, ferrite-based PM-SyR motors set up a low flux density in the main flux path that is not saturated. Furthermore, the rotor barriers create a large magnetic resistance. Thus, the stator field magneto-motive force ("MMF") generated by the stator winding currents cannot saturate the main magnetic path, but only the leakage flux path in the barrier bridges. It is this saturation of leakage flux path in the barrier bridges that allows the high frequency injection method to detect the rotor position based on the saliency setup on the rotor surface structure. Furthermore, the change of the leakage flux path in the barrier bridges affected by the stator currents can be exploited to determine polarity of a rotor at standstill or low speeds.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 11A-B illustrate one embodiment of a Ferrite PM-SyR motor. FIG. 11A shows a partial view of the motor structure and the rotor with magnetic carriers inserted with magnets; FIG. 11B shows the leakage flux paths in the rotor lamination barrier bridges.

FIG. 15A shows the speed command and actual speed following up. FIG. 15B shows actual phase currents during the starting process. FIG. 15C shows the control variable status updates.

FIG. 16A shows the speeds, FIG. 16B shows the position angle determination during the polarity detection process. FIG. 16C shows the current pulses during the polarity detection with alignment to the d-axis. FIG. 16D is the control variables update.

FIG. 17B shows the position angle compensation of 180 electric degrees. FIG. 17C shows the current pulses waveforms for the negative polarity detection result.

DESCRIPTION OF THE CURRENT EMBODIMENTS

Figure 1:
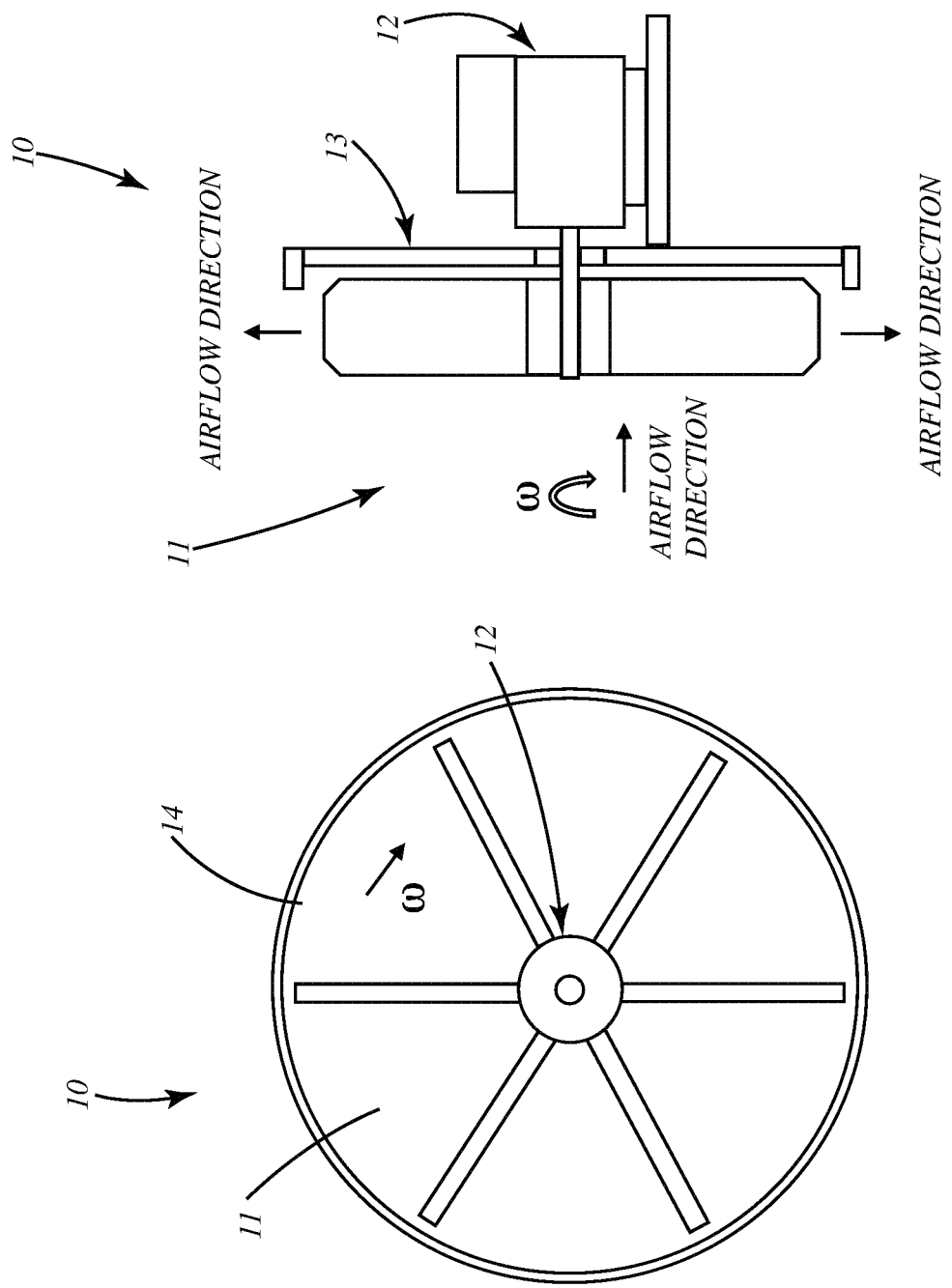
FIGS. 1A and 1B illustrate a front and side views of a commercial centrifugal fan or blower diagram showing the rotating fan wings and the airflow direction prior to motor startup.

The present disclosure is generally directed to control methodologies for use in connection with a permanent magnet assisted synchronous reluctance ("PM-SyR") motor. FIGS. 1A-B illustrate front and side diagrammatic views respectively of an exemplary commercial or industrial centrifugal fan 10 utilizing such a motor. The figures show exemplary components including fan blades 11, an Electronically Controlled Motor ("ECM") 12 (in particular a PM-SyR motor), and assembly structure 13. As the fan blades 11 are driven by the ECM 12 they rotate at a certain speed and rotating direction generating airflow. The fan can produce a specified airflow to satisfy an airflow requirement based on the configuration and/or programming of the motor electronics, typically incorporated within the motor.

A number of the components and control elements suitable for use in embodiments of the present disclosure having a PM-SyR motor are the same or similar components and control elements as described in connection with a sensorless interior permanent magnet synchronous motor ("IP-MSM") in 1) U.S. Pat. No. 10,784,805B1, entitled SYSTEM AND METHOD FOR INTERIOR PERMANENT MAGNET SYNCHRONOUS MOTOR CONTROL FROM ZERO OR LOW SPEED, granted on Sep. 22, 2020, to Bojoi et al., and 2) U.S. Pat. No. 10,819,264 B1 to Bojoi et al., granted on Oct. 27, 2020, entitled "ROBUST STARTING SYSTEM AND METHOD FOR INTERIOR PERMANENT MAGNET SYNCHRONOUS MOTOR CONTROL", and 3) U.S. Pat. No. 11,239,772 B1 to Bojoi et al., granted on Feb. 1, 2022, entitled "SYSTEMS AND METHODS FOR INTERIOR PERMANENT MAGNET SYNCHRONOUS MOTOR CONTROL", which are hereby incorporated by reference in their entirety.

Figure 2:
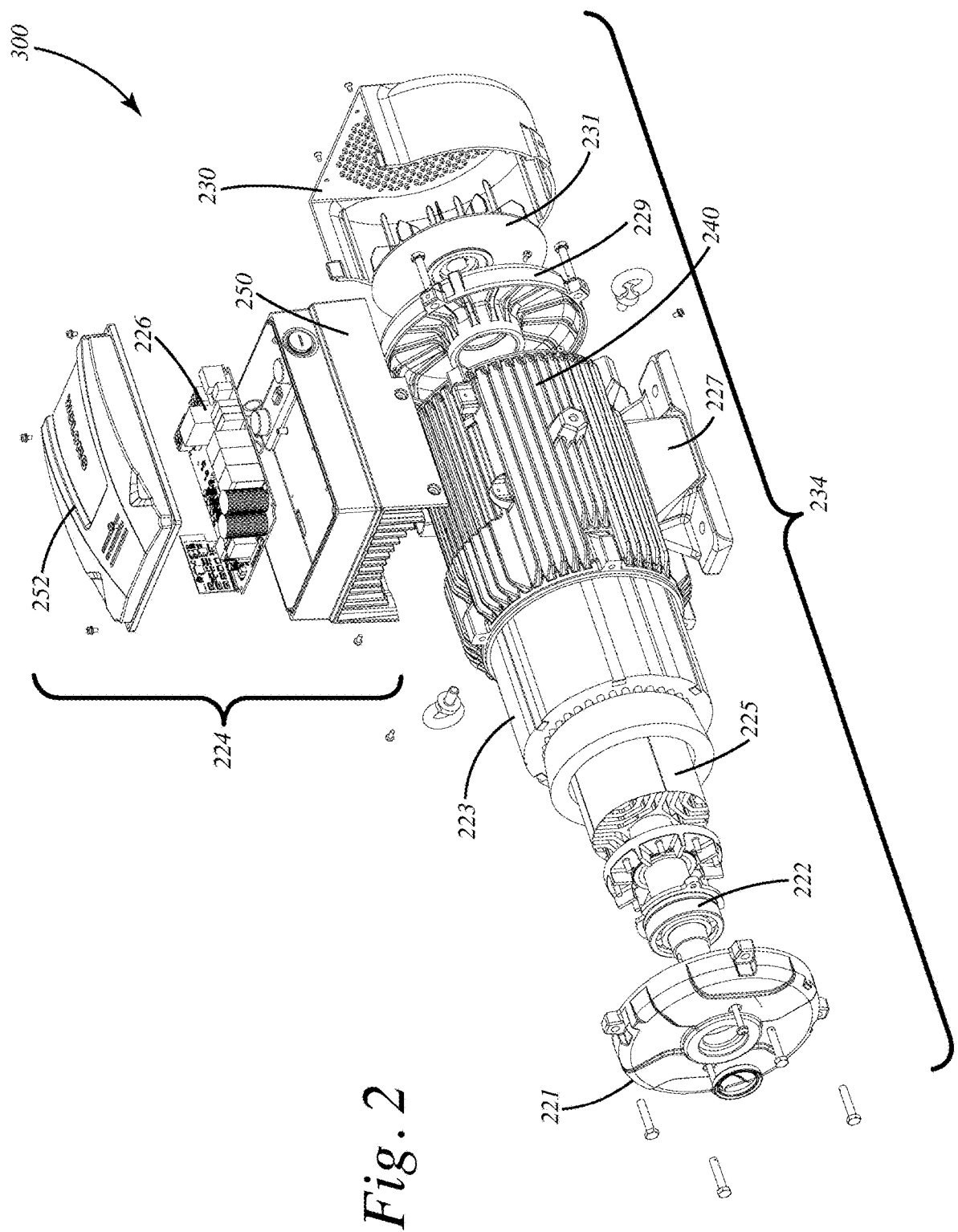
FIG. 2 illustrates an exploded view of a ferrite PM-SyR motor in accordance with one embodiment of the present disclosure.
Figure 3A:
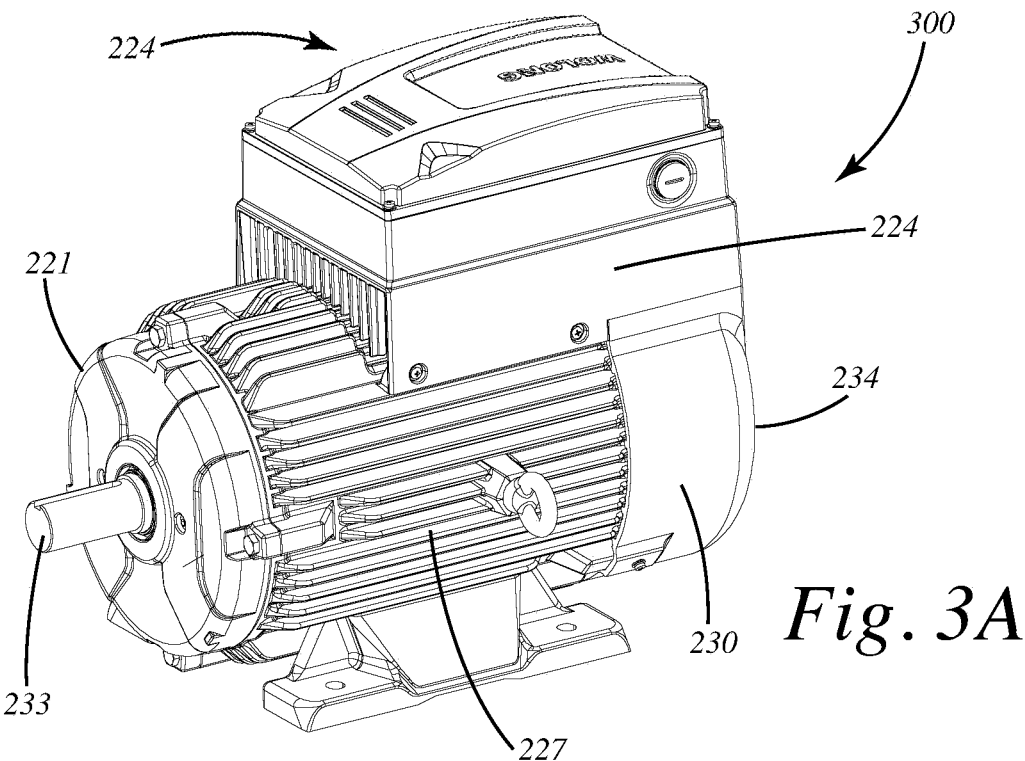
FIGS. 3A-B illustrate assembled front and rear perspective views of the PM-SyR of FIG. 2.
Figure 3B:
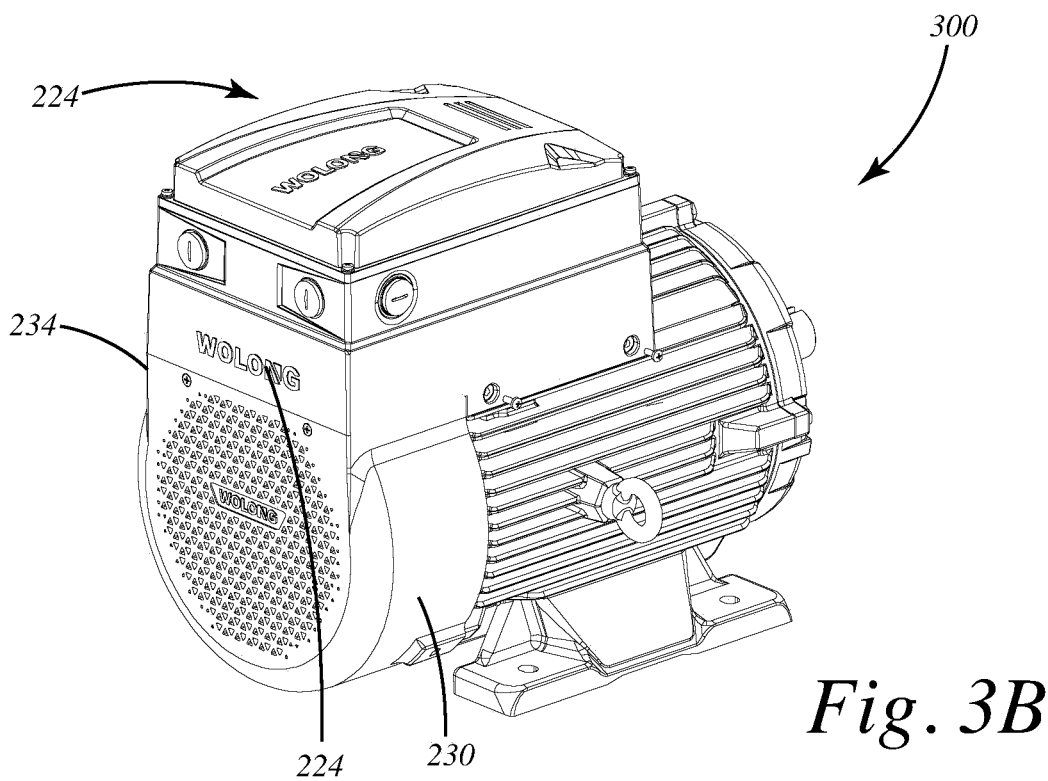

FIGS. 2 and 3A-B illustrate exploded, front perspective, and rear perspective views, respectively, of an exemplary embodiment of a PM-SyR motor 300 in accordance with embodiments of the present disclosure. The depicted motor is a PM-SyR motor system 300 using low-cost ferrite magnet material.

As an overview, the exemplary PM-SyR motor system 300 includes a motor control system 224, a stator 223, and a rotor 225. The current embodiment of the stator 223 is surrounded by heat dissipation ribs 240. The motor control system 224 is installed on the top of the motor body to the heat distribution ribs using a backpack configuration, and interface, which are described in more detail below. Frame 227 is secured to (or integral with) the stator or a subcomponent thereof, e.g., to the heat dissipation ribs along the exterior of the cylindrical stator 223 and provides mechanical structure to support and secure the motor in place with a foot mounting structure. In alternative embodiments, the PM-SyR motor system can include additional, different, or fewer components that can be arranged in a similar or different manner to provide a PM-SyR that can be disposed and/or mounted in essentially any suitable way.

The depicted embodiment of the motor has a housing or enclosure 234 that includes a front-end shield 221, a mid-shield 229 and a rear-end shield 230. The three shields are joinable to cooperatively form the motor enclosure 234 or motor housing. A lubricant or oil seal can surround the drive shaft 233 that extends out of the motor enclosure 234 and seals the front-end shield 221. In alternative embodiments, the motor enclosure can be formed from additional, fewer, or different constituent components that cooperate to house the motor in essentially any suitable way that enables the motor to convert electrical energy into mechanical energy, for example to rotate the drive shaft. In the current embodiment, a motor controller housing 224 is mounted on top of motor stator 223. The motor controller housing 224 can include a base housing 250 and a cover 252 that cooperate to provide a sealed motor controller enclosure for the PM-SyR motor electronics, including a PM-SyR motor controller 226.

The motor control system 226 is capable of driving multiphase AC electromagnetics of the stator 223 to create a magnetic field that rotates in time with the oscillations of the line current. The stator can have essentially any suitable winding configuration defining a suitable number of stator poles complimentary to the rotor poles. The current embodiment includes a three-phase stator winding configuration with four stator poles. Once at steady state, the rotor 225, for example via permanent magnets embedded in the rotor, turns in step with the stator 223 and as a result rotates the drive shaft 233 of the stator. The motor may include a bearing assembly 222 with one or more bearings that support and locate the rotor 225 to keep the air gap between the stator 223 and the rotor 225 small and consistent. The motor control system 226 may include a controller on a printed circuit board physically coupled to the motor controller enclosure 224.

The motor controller enclosure can provide airflow passageways for heat dissipation generated by the electronic components. Between the mid-shield 229 and the rear end shield 230, a rotating fan 229 can be included that propels airflow through the base housing 250 of the motor controller system 224 over the motor controller 226 PCB and through ventilation holes in the cover 252 of the motor controller housing. The rear end cover 230 has ventilation holes that permit passage of airflow for cooling purpose.

Figure 4:
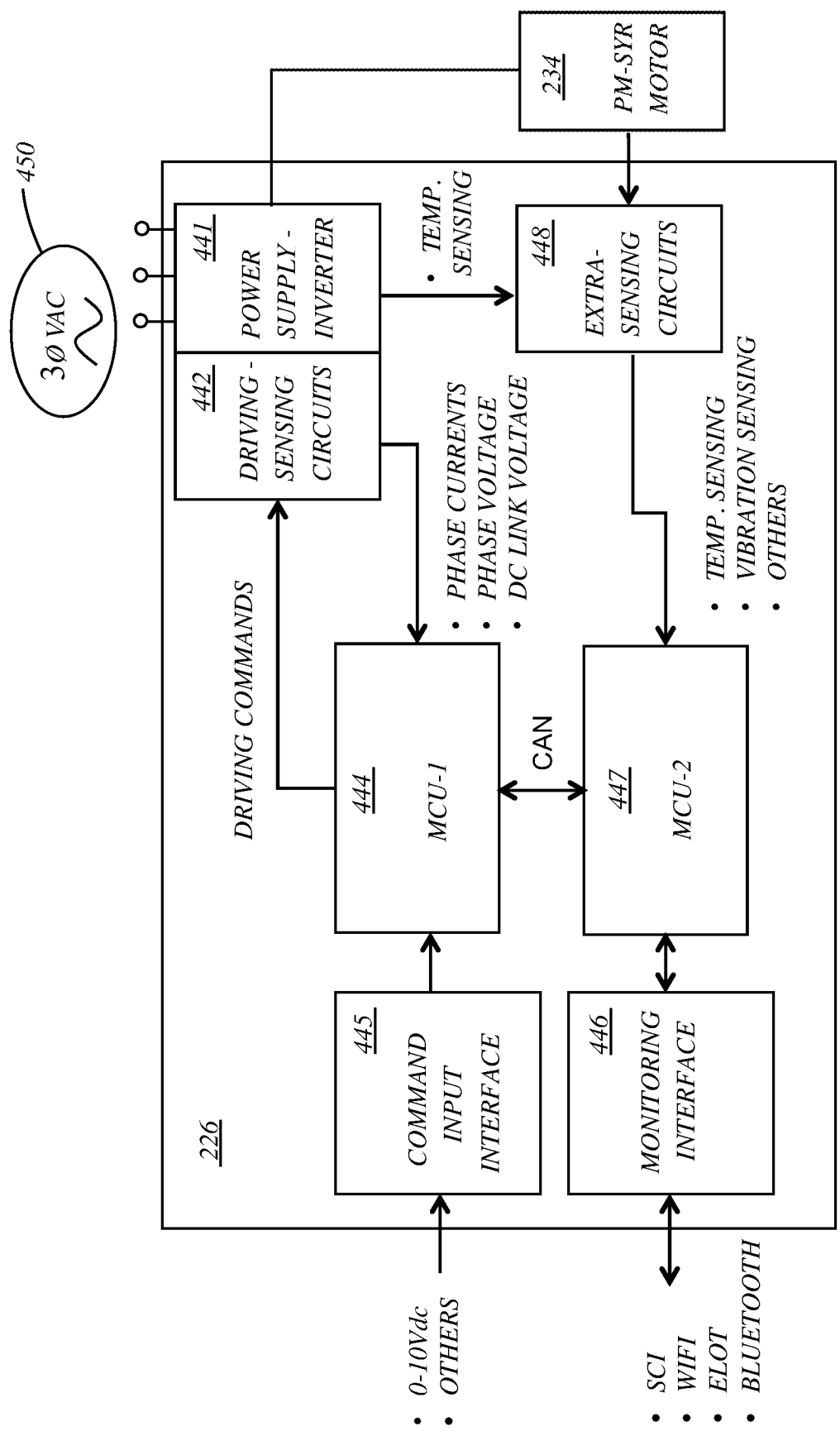
FIG. 4 illustrates a control system block diagram in accordance with one embodiment of the present disclosure.

Referring to FIG. 4, an overview of a motor control system 226 in accordance with the present disclosure will now be described. Generally, the motor control system 226 may include one or more microcontrollers, microprocessors, and/or other programmable electronics that are programmed to carry out the functions described herein. In this embodiment, there are two microcontrollers, or microprocessors, but in alternative embodiments there may be additional or fewer microcontrollers. The first microcontroller 444 (named MCU-1) is configured with various motor control algorithms and strategies to conduct calculations that provide dynamic motor responses, with a timing range in microseconds. Thus, the MCU-1 microcontroller, 444 includes a relatively powerful computing power microcontroller. The second microcontroller 447 (named MCU-2) is implemented with intelligent sensing and monitoring algorithms to conduct sensing, monitoring, and interfacing functionalities. In general, the computing power of MCU-2 447 can depend on the sophistication of the implemented sensing algorithms. Communication, including real-time communication, between the two microcontrollers 444, 447 can be handled over a Controller Area Network (bus), or other communication pathway, using the CAN protocol, or another suitable protocol. Details regarding the various motor controller software of the present disclosure, including both motor control algorithms and sensing algorithms are discussed below in more detail.

The hardware architecture of the two microcontrollers provides flexibility for both motor control and system control interface to extend their functionalities separately without influence on each other. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in another manner, whether combined into a single unit or distributed across multiple units. Such components may be physically distributed in different positions in the motor 300, or they may reside in a common location on the top of motor assembly, for example within the motor controller housing 224. When physically distributed, the components may communicate using any suitable serial or parallel communication protocol, such as, but not limited to SCI, WiFi, Bluetooth, Fire Wire, I2C, CAN, RS-232, RS-485, and Universal Serial Bus (USB).

Referring to FIG. 4, one embodiment of the motor control system 226 includes a combination of a variety of different electronic components, including, but not limited to, power supply circuitry 441 (e.g., an inverter) to convert three-phase source power 450 to a suitable voltage, current, and frequency, driving circuitry 442 to drive the motor stator windings based on driving commands, sensing circuitry 442 to sense one or more motor characteristics for use in the one or more motor control methods or motor speed estimation methods. This exemplary embodiment of the motor control system 226 includes a micro-controller unit 444 configured with one or more motor control methodologies (e.g., one or more motor speed estimation methodologies) that is configured to provide driving commands to the driving circuitry 442 based on sensed motor characteristics, and a command input interface 445 that provides various command inputs to the controller 444. The command input interface 445 can be configured to receive commands from an external device, such as a product system controller or another up-level control board. The motor control system can include a monitoring interface 446 for monitoring motor operation including the one or more motor control methodologies. The monitoring interface 446 can also communicate received sensing and monitoring information to an external device, such as an up-level control board. For example, the command input interface 445 and monitoring interface 446 may communicate with an external device via a transceiver or other communication device utilizing essentially any communication protocol, such as wireless communication protocol, such as Bluetooth or WIFI.

Another microcontroller unit 447 can be configured with various sensing and monitoring algorithms that can receive output variables from the other microcontroller 444 as well as additional sensors 448, such as the sensors installed within the motor 234 and/or the motor controller housing 224. For example, the additional sensing circuitry 448 can include temperature sensors, vibration sensors, or essentially any other sensors that may provide suitable sensor output (e.g., sensor output indicative of motor performance, motor efficiency, and/or motor health).

Figure 5:
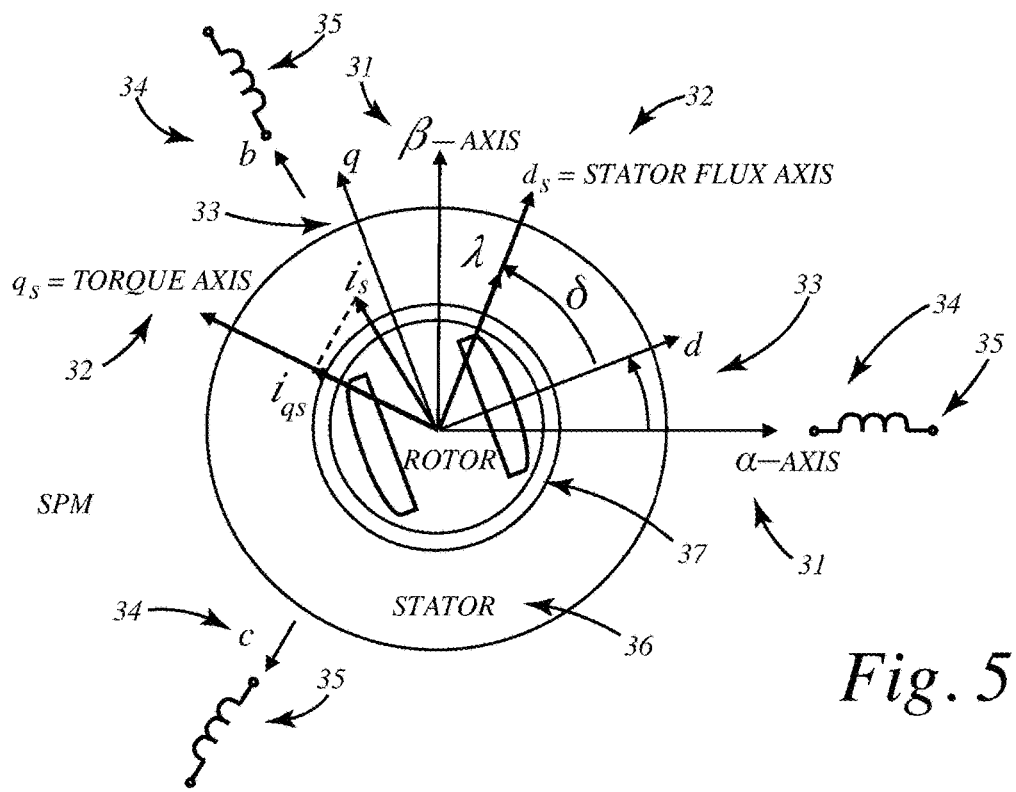
FIG. 5 illustrates reference axes for a PMSM.

Many motor control algorithms, including embodiments of the PM-SyR motor control algorithms discussed herein, can perhaps be best understood with reference to well defined vector reference frames. Adopted vector reference frames 30 are defined in FIG. 5, for a generic radial interior PMSM motor. The same adopted vector reference frames can be utilized with respect to a PM-SyR motor, which is a specific type of interior PMSM motor. The stator 36 includes three-phase windings (a-b-c) 35, if powered on, carrying three-phase currents respectively ($i_a$, $i_b$, $i_c$); these can be transformed into the stationary frame (α-β), 31. The rotor 37 rotating at a synchronous speed can be in a saliency structure, resulting in different permeabilities and inductances between the pole central line d-axis and the perpendicular line q-axis, referenced together as the synchronous rotor frame (d-q axis) 33. For example, the rotor structure of rotor 37 is a two-pole rotor design to ease explanation. However, the various embodiments are not limited to rotors with two poles, the PM-SyR high frequency injection and polarity detection can be utilized in connection with essentially any motor that has a magnetic saliency structure, including rotors that have other numbers of poles, such as the embodiment of FIG. 2, which illustrates a rotor with four magnetic poles.

Figure 6:
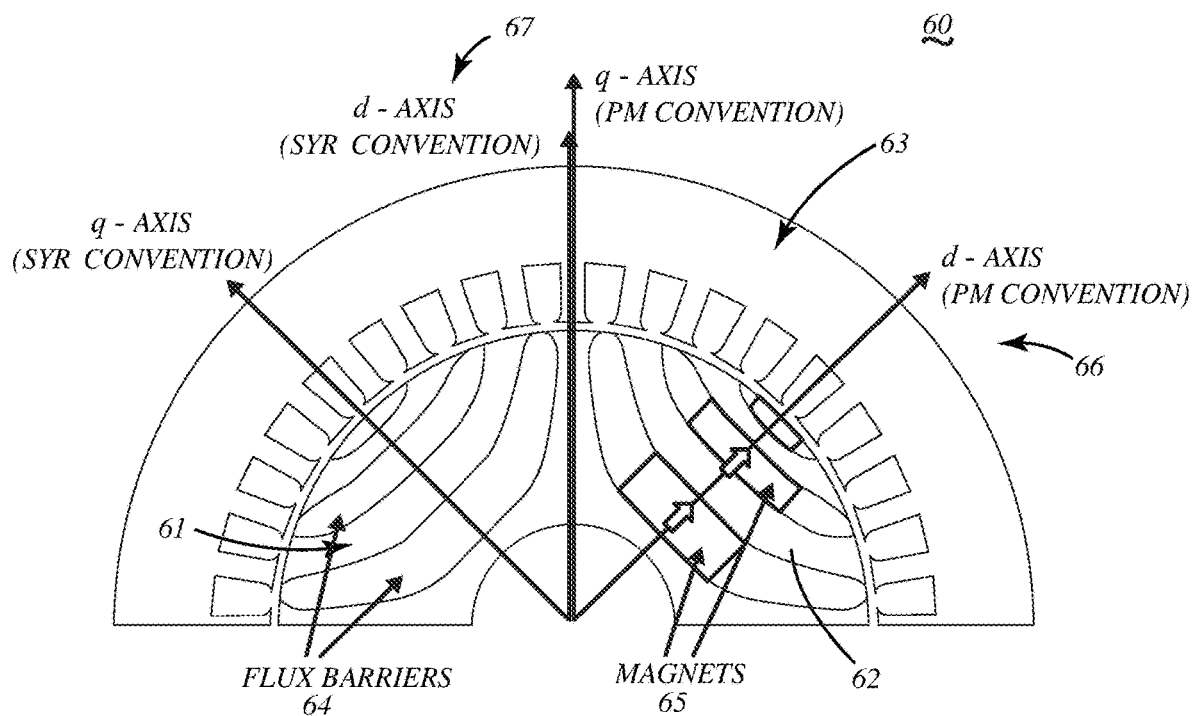
FIG. 6 illustrates a PM motor frame reference convention as well as a SyR motor frame reference convention.

FIG. 6 shows an exemplary cross-section of a typical 4-pole combination of two types of motors, a synchronous reluctance (SyR) motor (left side) 61 and a PM-SyR motor (right side) 62. In general, there is no meaningful difference in the stator winding structure 63 to build either one of these two motors. The SyR motor is a synchronous motor whose rotor has multiple flux barriers 64. In this depiction, the SyR motor includes three flux barriers 64 as shown. The produced torque is due to the magnetic anisotropy, as shown in FIG. 6. If the stator produces a stationary magnetic field, then the rotor high magnetic permeance axis will align with the magnetic field to minimize the system energy. If the stator field becomes a rotating field, the rotor will rotate in the same direction. Even though the SyR motor has low rotor losses, resulting in a high efficiency in operation, it has a low power factor (0.6-0.7) as the stator needs a substantial reactive current to magnetize the machine.

The PM-SyR motor is an evolution of the SyR motor. The PM-SyR motor uses magnets 65 in the flux barriers 64 to improve the power factor (right side FIG. 6), leading also to an efficiency improvement with respect to the SyR motor (without magnets shown on the left half of FIG. 6).

As shown in FIG. 6, the definition of the (d,q) rotor frame can be defined using two different conventional approaches:

PM convention: the d-axis is defined by the magnets North pole, as happens for Surface Mount PM (SMPM) motors and Internal PM (IPM) motors. For this reference frame, the magnets flux vector is aligned with the d-axis.

SyR convention: the d-axis is defined as the direction of maximum permeance. For this reference frame, the magnet flux vector is on the negative q-axis.

Either reference frame (or another reference frame entirely) can be utilized in the PM-SyR motor controller embodiments in accordance with the present disclosure. However, to maintain compatibility with previous patent applications (previously incorporated by reference) for interior permanent magnet motors, the adopted reference frame utilized throughout this disclosure uses the PM convention. Of course, it should be noted that either convention (or another convention entirely) could be adopted. Therefore, the magnetic model (cross-saturation neglected) and the electromagnetic torque of a PM-SyR have the same mathematical forms as for an IPM machine:

$$\begin{bmatrix} \lambda_d \\ \lambda_q \end{bmatrix} = \begin{bmatrix} L_d & 0 \\ 0 & L_q \end{bmatrix} \cdot \begin{bmatrix} i_d \\ i_q \end{bmatrix} + \begin{bmatrix} \lambda_m \\ 0 \end{bmatrix} \quad (1)$$

$$T_m = \frac{3}{2} \cdot p \cdot (\lambda_d i_q - \lambda_q i_d) = \frac{3}{2} \cdot p \cdot [(L_d - L_q) \cdot i_d i_q + i_q \lambda_m] = T_{rel} + T_{PM} \quad (2)$$

Where,
$T_m$: the motor electromagnetic torque
$T_{rel}$: the reluctance torque due to the magnetic anisotropy
$T_{PM}$: the PM torque due to the magnets One difference between PM-SyR and IPM motors is the different relationship between the reluctance torque due to the magnetic anisotropy and permanent magnet torque due to the magnets. In a PM-SyR motor, specifically when using ferrite magnets, the reluctance torque may account for a majority of torque production or dominate relative to torque production generated by ferrite permanent magnets. Furthermore, the main flux generated by the ferrite permanent magnets may not be as strong as that generated by other high performance magnets, such as Ned-Fe—B magnets, resulting in a low saturation status over the stator flux path under the main field, no load condition.

Known interior permanent magnet control techniques may be applied theoretically to control PM-SyR motor systems over their entire speed range with certain load conditions. However, there are specific issues that can arise within the context of PM-SyR motor control that are not present with other types of interior permanent magnet motors. For example, for permanent magnet assisted synchronous reluctance motors, the position dependence of the inductance caused by the magnetic saliency of the rotor is often used to estimate the pole position in the low or zero speed range. However, in these situations, the polarity of the magnetic poles of the rotor are unknown, which can cause issues during startup. Accordingly, improved motor control methodologies can be provided to improve performance, reliability, and other metrics of PM-SyR motor control. For example, methods to efficiently and effectively determine the magnetic polarity of the rotor magnetic poles where the position of the poles is known (e.g., estimated) can greatly improve motor control methodology.

I. Rotor Magnet Polarity Detection for PM-SyR Motors

Because ferrite magnet based PM-SyR motor torque production is dominated by reluctance torque, not permanent magnet torque, some effective starting methods may not work reliably at zero or very low speed starting speeds. This is generally the case because the parking of a PM-SyR rotor will not be aligned with the d-axis, but instead it will generally be aligned with an intermediate angle between the d-axis and q-axis. Accordingly, IPM starting methods that rely on d-axis or q-axis alignment at zero or low speeds are generally not feasible for PM-SyR motors.

High frequency injection ("HFI") is the basis for one form of rotor magnetic pole position detection. High frequency injection refers generally to injecting high-frequency current into the stator windings of an AC motor. In response to a high-frequency current being injected into the stator winding, it creates a magnetic field that interacts with the motor's rotor. By analyzing the response of the rotor to the injected current additional control over the motor is possible. By injecting a high-frequency current into the stator, it is possible to create a rotating magnetic field that is out of phase with the motor's normal operation. This can be used to reduce the motor's starting current or to control the speed of the motor more precisely. U.S. Pat. No. 10,784,805, entitled SYSTEM AND METHOD FOR INTERIOR PERMANENT MAGNET SYNCHRONOUS MOTOR CONTROL FROM ZERO OR LOW SPEED, granted on Sep. 22, 2020, to Bojoi et al., which was previously incorporated by reference in its entirety, describes how HFI can be utilized to control startup for an interior permanent motor synchronous motor.

Figures 7A, 7B:
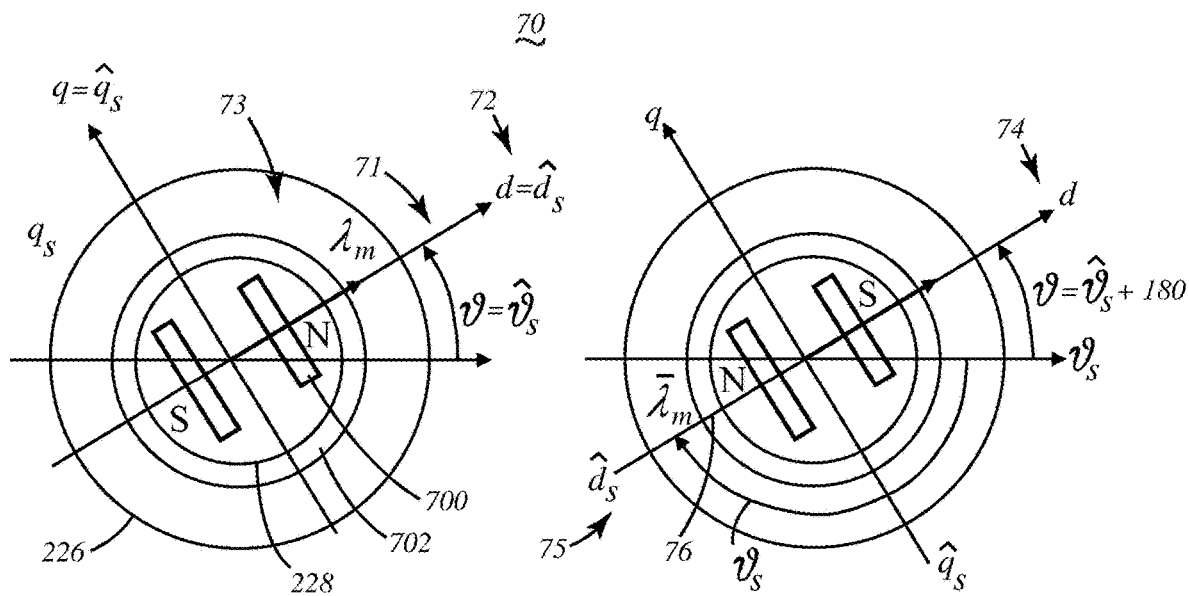
FIGS. 7A and 7B illustrate detection of magnet polarity according to the peak values of the current pulses where the signal injection method detects the magnet polarity in the d-axis.

The HFI method with pulsating carrier generally has an uncertainty of 180 electrical degrees in tracking the motor d-axis because it becomes zero two times over one electrical period. That is, HFI methods can determine the rotor position in terms of the position of the magnets relative to the stator but cannot determine the magnetic polarity of the permanent magnets. For example, with reference to FIGS. 7A-B, the previous HFI method can determine the permanent magnets are positioned as shown in FIGS. 7A and 7B, however, the method cannot distinguish the polarity of the magnets and hence cannot distinguish between the two different rotor positions. This is because the HFI method relies on magnetic saliency, which is the same along the d-axis, regardless of which permanent magnet is the north pole magnet and which is the south pole magnet.

Two possible situations may occur, as shown in FIGS. 7A-B. In the first case, the HFI position detection method detects the motor d-axis (positive). In this circumstance, the rotor's actual main flux axis 71, the rotor's estimated main flux axis 72 and rotor magnet flux linkage vector position 73 are all aligned together in FIG. 7A. In the second case, the HFI method detects the negative d-axis. Referring to FIG. 7B, the rotor's actual main flux axis 74 and rotor magnet flux linkage vector position 76 are aligned, but the rotor's estimated main flux axis is 75, 180 degrees different from the actual main flux axis 74.

Therefore, after the execution of the HFI method, an additional test is needed to identify if the detected axis is the positive d-axis (FIG. 7A) or the negative d-axis (FIG. 7B), i.e., to detect the magnet polarity.

Figure 8:
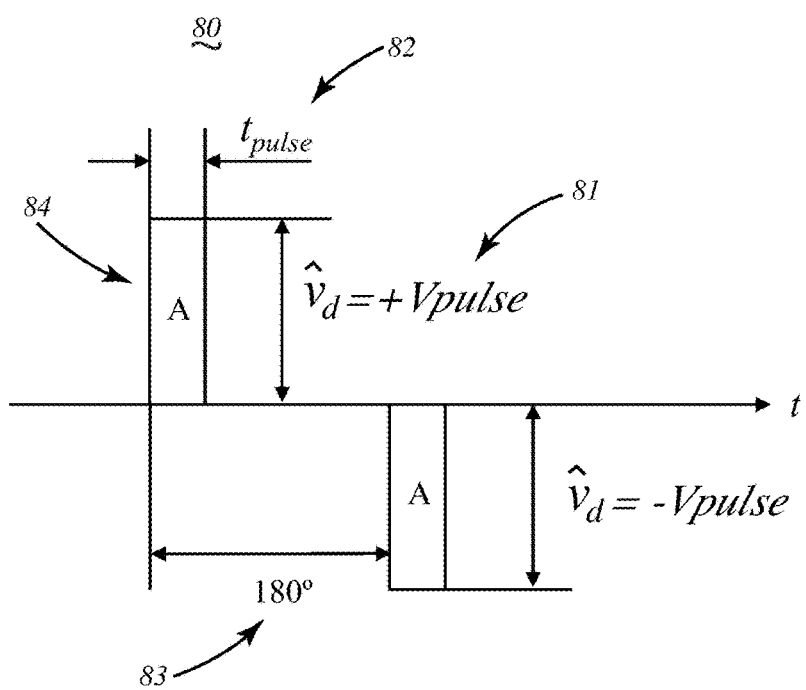
FIG. 8 illustrates exemplary voltage pulses for a magnetic polarity detection method, showing pulse amplitude, width, and positions.

A special voltage waveform can be utilized as a detecting profile to execute the polarity detection. In one embodiment, the waveform includes two voltage pulses, $+V_{pulse}$ and $-V_{pulse}$ that are 180 electrical degrees out of phase—that is the second voltage pulse waveform is shifted in time equal to half its period. FIG. 8 illustrates the two voltage pulses with a certain amplitude $V_{pulse}$, 81 and time $t_{pulse}$ length, 82 on the detected axis and on the negative detected axis, the distance is the motor rotor pole span length 83.

Assuming low speed range (−10−+10 RPM) or no rotor movement, the detected d-axis voltage equation is, $$\hat{v}_d = R_s \cdot \hat{i}_d + \frac{d\hat{\lambda}_d}{dt} \Rightarrow \hat{\lambda}_d = \int (\hat{v}_d - R_s \cdot \hat{i}_d) dt + \lambda_m \quad (3)$$

Neglecting the voltage drop on the stator resistance, then (11) becomes, $$\Delta\lambda = \hat{\lambda}_d - \lambda_m \cong \int \hat{v}_d dt \quad (4)$$

The d-axis voltage includes two voltage pulses 84 of identical volt-seconds defined as shown in FIG. 8.

$$A = \int \hat{v}_d dt = V_{pulse} \cdot t_{pulse} \quad (5)$$

The characteristic of d-axis inductance $L_d$ variation as the d-axis current $i_d$ changes can be obtained by processing the magnetic model method that represents the current versus the flux relationship. These curves are different for a PM-SyR motor than an IPM motor, which means the methodology for accurately detecting polarity is different.

Figure 9A:
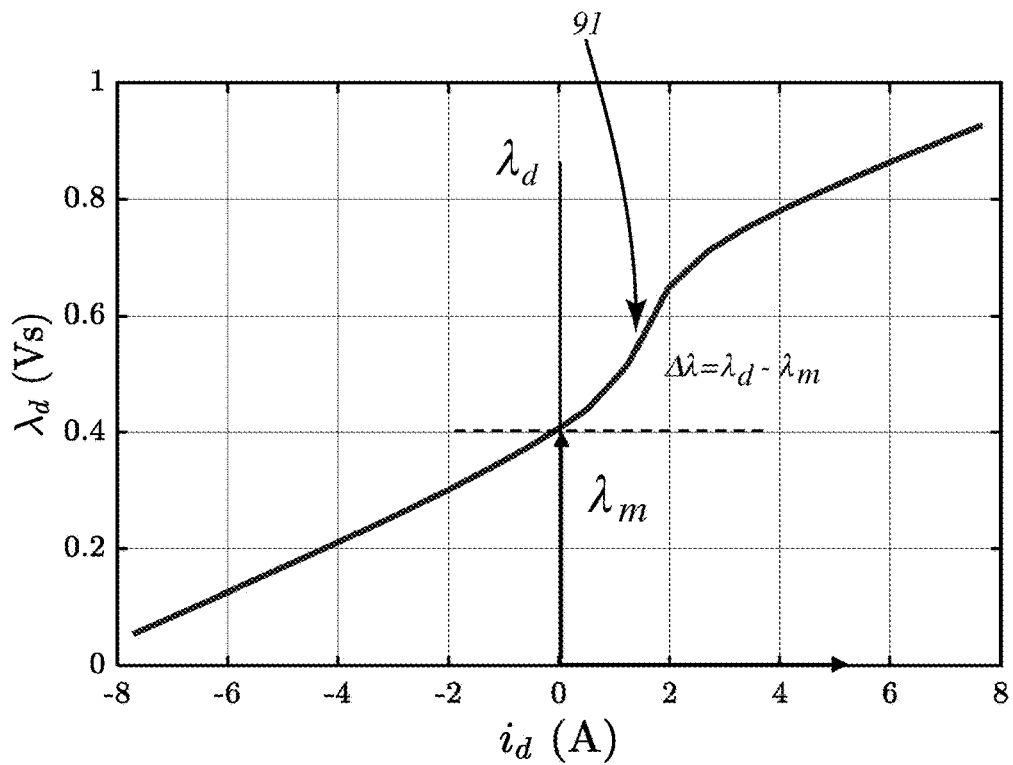
FIG. 9A illustrates a direct magnetic model, showing d-axis flux rapidly increasing as the current increases.

As shown in FIG. 9A, for a PM-SyR motor when the d-axis current $i_d$ is positive, but below a certain current value, such as in the range from 0 A to about $i_d$<2.5 A, the d-axis flux linkage $\lambda_d$ increases with a stiff slope 91, resulting in the d-axis inductance $L_d$ increasing rapidly and nonlinearly (there is a direct relationship between d-axis flux linkage and d-axis inductance). In contrast, when the d-axis current is negative, $i_d<0$ the magnetic behavior of the d-axis flux linkage $\lambda_d$ and inductance $L_d$ is quite linear with changes in the d-axis current. This stark contrast in responses to positive and negative d-axis currents can be leveraged for efficient and effective PM-SyR polarity detection. Put simply, a controller can be configured to apply a positive voltage pulse and a negative voltage pulse to the stator winding configuration. Depending upon the current response to the positive voltage pulse and the negative voltage pulse, the magnetic polarity of the magnetic poles can be determined based on the relative magnitudes of the current responses.

The magnitude of the pulses can be selected such that one of the positive voltage pulse and the negative voltage pulse demagnetizes the directionally magnetized flux density in one or more of the rotor surface bridges, and the other one further magnetizes the flux density in the at least one of the plurality of surface bridges. Where the magnetic flux density in the rotor surface bridge(s) is demagnetized, the inductance increases resulting in a lower relative response current than the situation where the magnetic flux density in the rotor surface bridge is further magnetized.

Figure 9B:
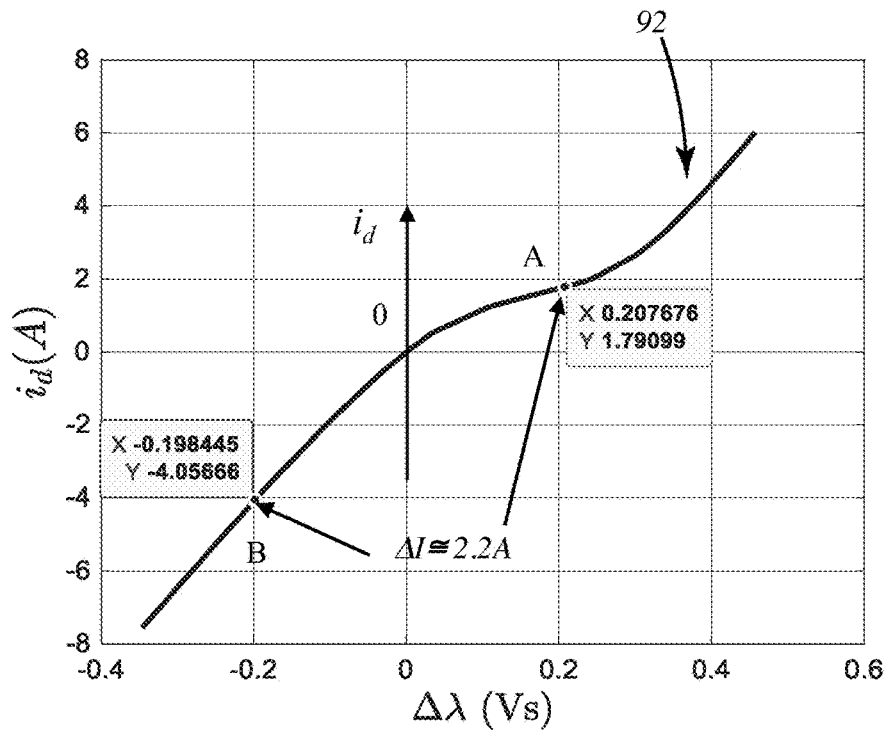
FIG. 9B illustrates an inverse magnetic model showing the inductance increasing and current reduction in comparison with the negative one.

The magnetic model can be processed further in MATLAB, or another analysis tool, to obtain the inverse magnetic model of flux variation versus current relationship. Such a characteristic curve is shown in FIG. 9B for an exemplary PM-SyR motor. A flux variation of 0.2 Vs that is applied to both positive and negative direction leads to a quite large d-axis current difference (2.2 A).

There is a reflection point, "A" on the magnetic model curve 92. In the range from 0 to this point, the d-axis inductance $L_d$ increases nonlinearly and rapidly. Above this point, the d-axis inductance $L_d$ turns to a different characteristic in variation. This characteristic is specific to ferrite PM-SyR motors and can be leveraged to make polarity detection more precise and robust with a relatively small current when the d-axis current is below this reflection point. As discussed later, the polarity detection methodology can be adapted to accommodate other types and configurations of PM-SyR motors, e.g., PM-SyR motors that utilize other types of magnets or have different numbers and configurations of flux barriers.

Exemplary control logic for polarity detection of ferrite PM-SyR motors will now be described in detail:
If the current response ($I_{pulse1}$) to the positive voltage pulse (+$V_{pulse}$) is lower than the current response ($I_{pulse2}$) to the negative voltage pulse (-$V_{pulse}$), then the PM-SyR high frequency injection (HFI) has properly detected the d-axis and the motor controller utilizes the detected HFI position.
If the current response ($I_{pulse1}$) to positive voltage pulse (+$V_{pulse}$) is higher than the current response ($I_{pulse2}$) to the negative voltage pulse (-$V_{pulse}$), then the PM-SyR HFI has detected the negative d-axis and therefore the motor controller applies a correction to the detected d-axis HFI position (the amount of the correction may depend on the number of magnetic poles, for example for a four pole rotor, a 90 electrical degree correction may be utilized).

Figure 10C:
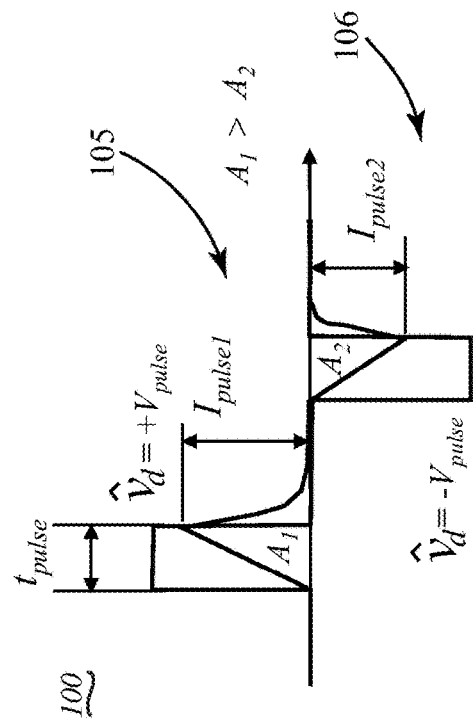
FIGS. 10C and 10D illustrate detection of magnet polarity according to the peak values of the current pulses where the polarity detection method detects the magnet polarity in the negative d-axis.
Figure 10D:
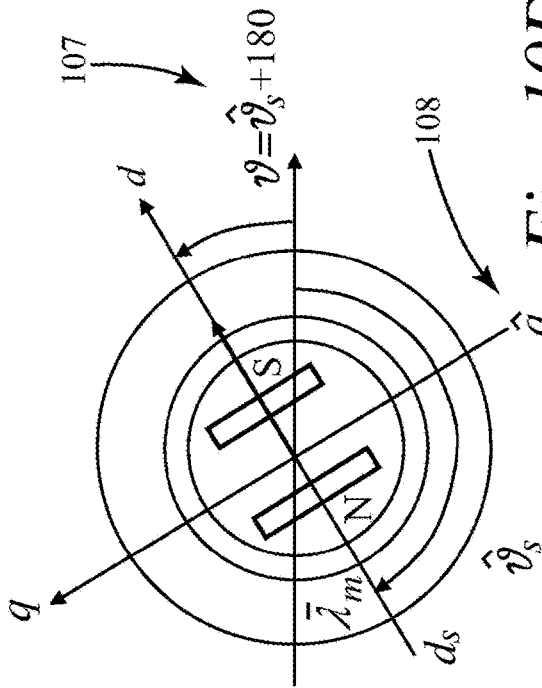
Figure 10A:
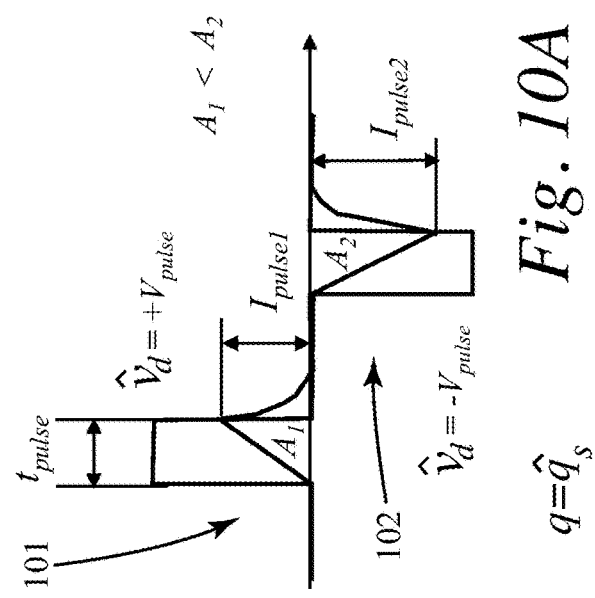
FIGS. 10A and 10B illustrate detection of magnet polarity according to the peak values of the current pulses where the polarity detection method detects the magnet polarity in the d-axis.
Figure 10B:
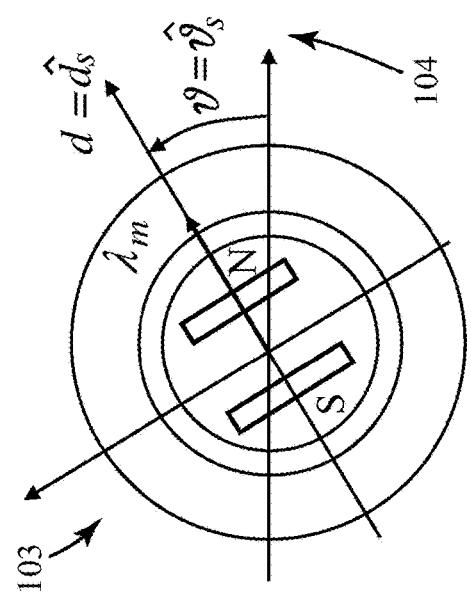

The volt-second values of the injected voltage pulses being identical, the amplitudes of the response current pulses will differ, as shown in FIG. 10A or FIG. 10B (again shown with a two-pole embodiment for ease of explanation). Where $I_{pulse1}<I_{pulse2}$, as shown in FIG. 10A, the positive direction of the rotor axis, i.e., the correct magnet polarity 104 in FIG. 10A shows that the estimated q-axis overlaps the real q-axis. The two possible situations are summarized in FIGS. 10A-D.

In first case, depicted in connection with FIGS. 10A-B, the first current pulse 101 is lower than the second one 102, so the HFI method provides the correct estimated rotor position that matches the actual rotor position, 103 and 104. That is, the $\hat{d}_s$ matches the d-axis and the $\hat{q}_s$ matches the q-axis. In the second case, depicted in connection with FIGS. 10C-D, the second pulse 106 is smaller than the first one 105, so the HFI method has provided the negative magnet polarity (negative d-axis). As a result, the position provided by the HFI method is corrected with 180 electrical degrees 107 and 108. Accordingly, the polarity detection method is able to distinguish the position of the rotor with respect to the poles of the magnets for a PM-SyR motor.

In comparison with known HFI methods (such as described in U.S. Pat. No. 10,784,805, which was previously incorporated by reference in its entirety), the logic to detect the correct polarity for the ferrite PM-SyR motors is unexpectedly inverse from that for IPM motors generally. The two types of motors have different structure and characteristics that lead to this, which will be discussed below.

In addition, because position and speed can be detected through the HFI process prior to the polarity detection, the position/speed information can be used as an input to the polarity detection current pulse integration processing during the $t_{pulse}$ Eq. (5) to improve precision when the rotor is rotating at a low speed (e.g., about 10 RPM or lower).

II. Polarity Detection Effectiveness in PM-SyR Motors

The characteristics of d-axis inductance $L_d$ increase are shown in FIGS. 9A and 9B. These exemplary values can be obtained through magnetic model acquisition and empirical testing. The same relationship between flux variation and d-axis current can be obtained by Finite Element Analysis (FEA) of motor designs. FIG. 11A shows an exemplary ferrite PM-SyR motor FEA design model. The motor stator 111 includes multiple-phase windings 112 that are embedded into slot groups (three slot groups A, B, C in this embodiment). The motor stator 111 of this PM-SyR motor is essentially identical to the stator of an induction motor. The rotor 116 is a synchronous reluctance rotor having a plurality of flux barriers 115, which can also be referred to as rotor barriers, magnet bases.

The rotor 116 can also be referred to as a rotor core. The rotor core can be made of a soft magnetic material, such as laminated silicon steel. It can be shaped as a disc with a shaft hole in the center. The rotor core can be divided into a number of magnetic poles, which are created by stamping or punching slots 115 in the core. The slots 115 create magnetic flux barriers that prevent the magnetic flux from flowing in the wrong direction. The rotor core can be mounted on the motor shaft and be turned by the magnetic field created by exciting the stator winding configuration (e.g., a three-phase stator winding configuration).

Permanent magnet assisted synchronous motors have permanent magnets 117 in the slots 115 of the rotor 116. The permanent magnets provide a small amount of torque that helps to start the motor and to improve the power factor and efficiency of the motor.

The rotor flux barriers 115 can be arranged in a specific pattern to control the magnetic flux and generate torque. One arrangement of flux barriers is a segmented flux barrier rotor, where the rotor has alternating magnetic poles and flux barriers. The flux barriers in a segmented rotor can be made of a non-magnetic material and positioned between the magnetic poles to create a path of low magnetic reluctance.

This can create a high magnetic flux density in the magnetic poles, which generates torque when the rotor rotates. The arrangement and configuration of the flux barriers can vary, for example, concentrated flux barriers, semi-distributed flux barriers and distributed flux barriers are some of the different possible configurations. The flux barrier selection for a given motor can depend on the specific requirements of the motor, including torque and efficiency, as well as manufacturing and cost constraints.

For power factor improvement, ferrite permanent magnets (or other types of permanent magnets) can be installed into some or all of the slots/flux barriers. In the depicted embodiment, the rotor 116 includes three layers of flux barriers in the reluctance motor design, with each barrier including a plurality of magnets 117. For ease of explanation, FIG. 11A depicts only a quarter of a four magnetic pole motor highlighting the relationship between the stator 111 and rotor 116.

The rotor core can include a plurality of rotor bridges that span the flux barriers/slots. Perhaps as best shown in FIG. 11B, the bridges can include outer or surface bridges, e.g., bridges B1, B2, B3 toward the perimeter of the rotor. As shown in FIG. 11A, the rotor can also include inner bridges (e.g., bridge B4 toward the inner layers of the rotor core). A rotor bridge generally refers to a mechanical component that connects rotor segments together. The PM-SyR motor generally includes alternating flux barriers 115 and rotor segments 120. To ensure that the rotor segments 120 remain in place and maintain proper alignment during motor operation, rotor bridges can be used to connect the rotor segments together. The rotor bridges can be made of a non-magnetic material and placed toward the ends of the rotor segments, connecting them to form a rotor assembly 116. The bridges can provide mechanical stability to the rotor and prevent axial movement or any deformations between the rotor segments. Characteristics and number of rotor bridges may vary depending on the specific embodiments of the PM-SyR motor, such as the rotor diameter, the number of rotor segments, and the operating conditions. Generally, the bridges are designed to be lightweight and strong enough to withstand the centrifugal forces generated during motor operation, while also providing low magnetic interference to the magnetic flux in the motor. In general, the sizes of the bridges are balanced to provide suitable mechanical strength of the rotor structure while also keeping leakage flux low. In this regard, the width of the bridges is preferred to be as small as possible because in general the larger the bridge, the larger the amount of leakage flux, but manufacturing requirements generally demand the bridges be larger than about 1.0 mm thick to meet a desired mechanical rotor strength.

Stator lamination refers to a component in an electric motor made up of thin sheets of electrical steel. The sheets can be stacked together and then cut and formed into a specific shape to create the stator core. The stator lamination is generally responsible for providing the magnetic field that interacts with the rotor to generate the electromagnetic force that produces the desired rotating torque or mechanical power. The thin sheets of steel (or other material) used in the stator lamination can be coated with an insulating material to prevent electrical currents from flowing between the sheets and causing energy losses in the form of heat. The sheets can also be punched with holes to accommodate the wire, typically copper, windings that carry the electrical current through the stator. The shape and size of the holes, as well as the spacing of the sheets, can be selected based on a variety of factors and can influence the performance of the motor based on a variety of metrics.

A rotor lamination is similar to a stator lamination. It is also made up of thin sheets of electrical steel that are stacked together and then cut and formed into a specific shape to create the rotor core. The rotor lamination rotates within the magnetic field generated by the stator, producing the desired rotating torque or mechanical power. Like the stator lamination, the thin sheets of steel used in the rotor lamination are coated with an insulating material to prevent energy losses due to eddy currents. The shape and size of the rotor lamination can be designed to optimize the performance of the motor, taking factors such as torque, speed, and power factor, etc. into account.

At any given rotor position relative to the stator there are main magnetic flux paths between the rotor flux path segments 120 and the stator 111. There are also unloaded leakage magnetic flux paths through the surface bridges (e.g., through B1, B2, B3) that have directionally magnetized flux density caused by the permanent magnets 117.

Figure 12A:
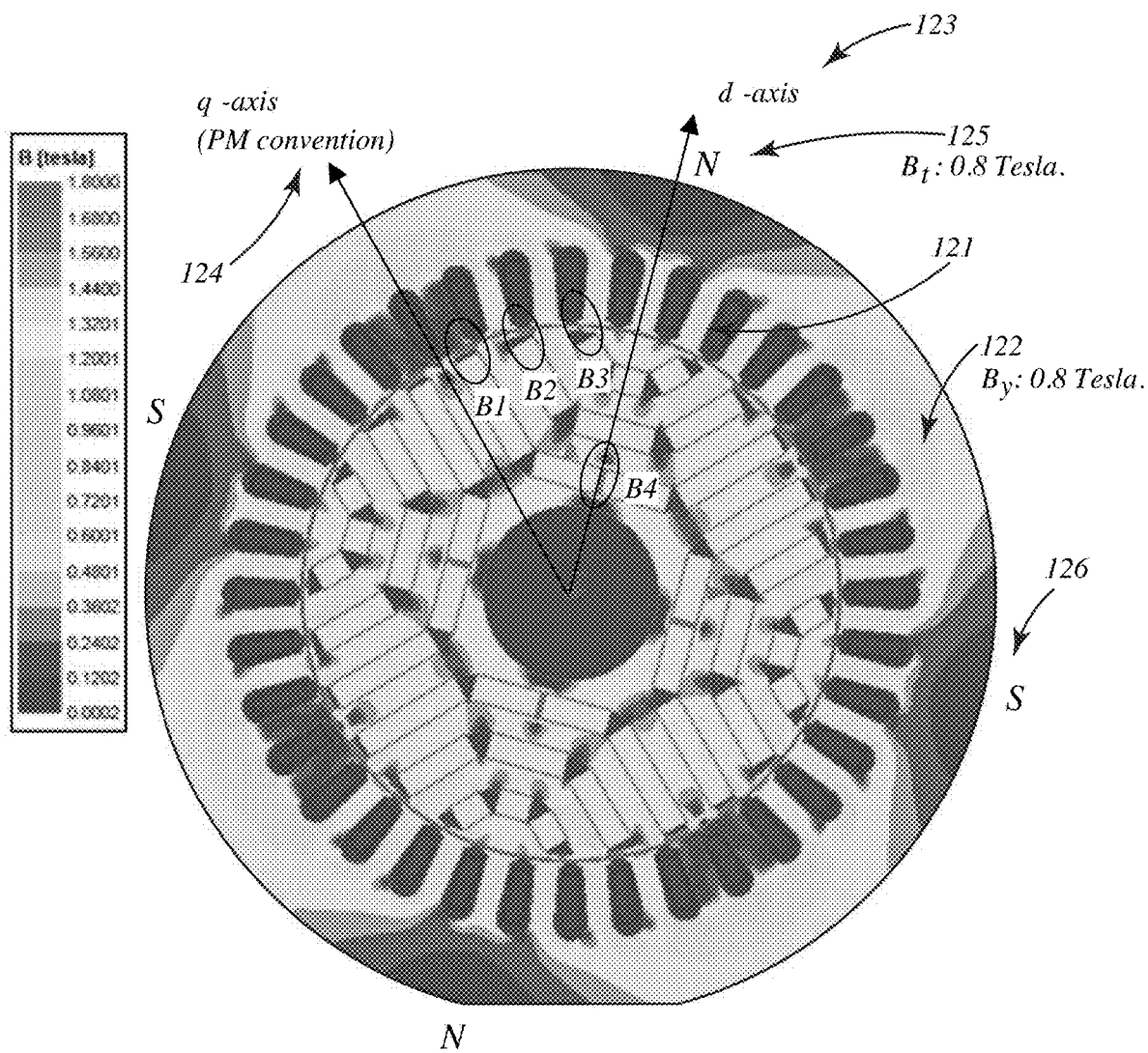
FIG. 12A illustrates a no-load FEA result showing the flux density distribution and leakage flux density in the bridges.

FIG. 12A shows a no-load working condition FEA magnetic field distribution map for an exemplary PM-SyR motor. That is the flux density distribution throughout the stator and rotor due to the magnetic fields generated by the permanent magnets are depicted. As depicted, many of the unloaded leakage magnetic flux paths through the bridges (e.g., B1, B2, B3) are at or near magnetic saturation due to the magnetic fields of the magnets. The specific rotor barrier design structure and resultant flux densities permit a robust starting motor control algorithm with accurate polarity detection. The rotor magnetic polarities are shown at 125 and 126 for this rotor position. While the North and South poles are depicted in FIG. 12A, during startup these polarities are unknown-only the position of the rotor is known. For the 4-pole rotor shown, the method of polarity detection can determine whether the d-axis is in the depicted position toward one of the north poles, or whether the d-axis is instead pointed toward one of the south poles. In this 4 pole configurations, there are two north poles and two south poles. In other configurations, e.g., with 6, 8, 10, or more poles, there may be 3, 4, or 5 north poles and 3, 4, or 5 south poles. In those situations, the polarity detection methodology can determine whether the d-axis is aligned with a south or north pole.

Behavior of the motor during startup can be influenced by magnetic saturation of the stator and rotor. Saturation of a stator or rotor generally refers to the point at which the magnetic field cannot increase further (or increases at a lower rate), even if the current flowing through the windings is increased. This is because the magnetic properties of the core material become fully utilized and cannot support additional magnetic flux.

When the stator or rotor is saturated, any increase in current through the windings will only result in increased power losses in the form of heat, rather than increased magnetic field strength. To avoid saturation, the stator and rotor can be designed with carefully selected magnetic properties that are suitable for the application. In addition, the shape and size of the laminations can be selected to ensure that the magnetic flux is distributed evenly, and that there are no or few areas where the magnetic field becomes concentrated, which can lead to local saturation.

Because the magnetic field flows through different portions of the stator and winding depending on a range of factors (e.g., excitation of the stator and/or permanent magnets), flux density at certain locations may be higher or lower than others due to the relative position of the stator and rotor, as well as the positions, timing, and/or interactions of different magnetic fields.

In general, during startup the stator lamination is not saturated yet, the flux density in the stator is still quite low. For example, in one embodiment, the stator teeth 121 has at most about 0.8 Tesla for both the stator tooth 121 as well as the stator yoke area 122, indicating that the permanent magnet magnetic field is low, and the main magnetic path is not saturated at no-load condition.

At startup, the rotor lamination is generally not saturated either. In addition, because the carrier width or ferrite permanent magnet height is quite large, the rotor reluctance is high, leading to a small d-axis inductance $L_d$ in comparison with that of an IPM motor with Ned-Fe—B magnets.

However, the unloaded leakage magnetic flux density through many of the surface bridges is high, being at or near magnetic saturation (e.g., ~1.6 Tesla or higher). There can be high flux density areas in the bridge of each flux barrier top, B1, B2 and B3, for example measuring above 1.6 Tesla.

Magnetic saturation has a directional component to it. That is, it is worth noting that the surface bridges have a directionally magnetized flux density due to the magnetic fields generated by the magnets. This directionally magnetized flux density in the bridges are in a leakage flux path (with respect to the main flux path). This means that if the main magnetic flux path between the rotor segments and the stator flows in the same direction as the leakage flux path, the magnetic field will further magnetize the leakage flux path until saturated (if its not already fully saturated), but if it flows in the opposite direction as the leakage flux path it will demagnetize the leakage flux path. During normal operation, the saturation/desaturation of the bridges has a relatively minor effect (if any) on motor operation. However, during startup, since the d-axis inductance $L_d$ is small, these bridge saturation situations that are in the leakage paths can lead to large changes in the d-axis inductance when a positive or negative voltage is applied to the stator windings.

When a positive d-axis voltage is applied into the windings, the flux density in the main magnetic path increases linearly as the main flux increases, meanwhile the leakage flux density in the rotor bridges decreases rapidly because the magnetomotive force (MMF) generated by the stator windings is opposite to the MMF generated by the ferrite permanent magnet, resulting in the main flux increases. Taking the non-saturated condition at the stator into account, the main flux increasing, and leakage flux decreasing drives the d-axis inductance to a larger value.

Figure 12B:
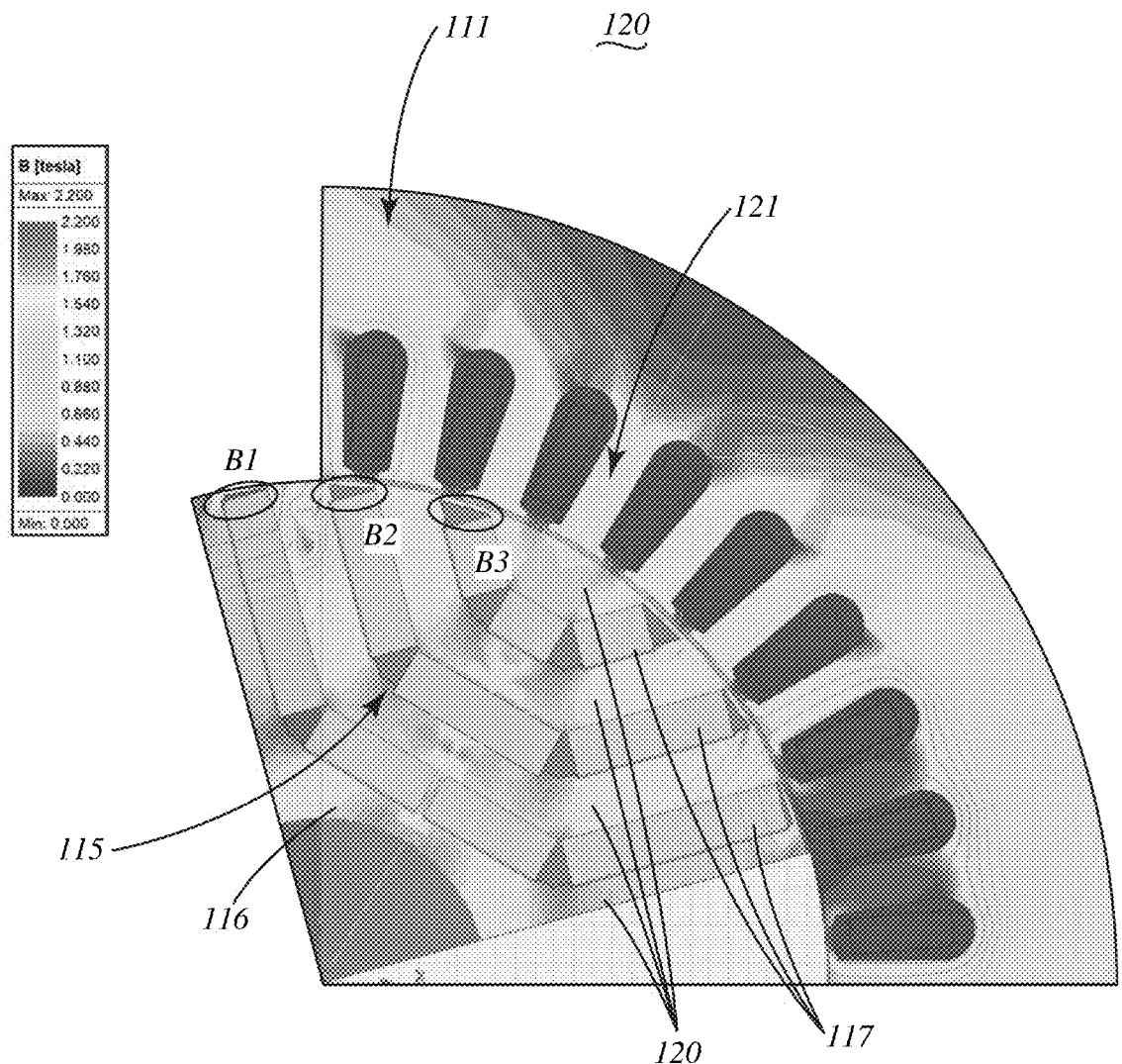
FIG. 12B illustrates a partial no-load FEA result showing the flux density distribution and leakage flux density in the bridges where the rotor is in a different position than in FIG. 12A relative to the stator.

Referring to FIG. 12B, the relative position of the rotor and stator is different from FIG. 12A and therefore the surface bridge flux densities are different. In the exemplary rotor position depicted in FIG. 12B the flux densities in the bridges are substantially lower (e.g., ~1 Tesla). Accordingly, when the magnitude of the voltage pulses are selected they should be selected such that the surface bridge leakage magnetic flux paths are demagnetized to be close to zero regardless of whether the leakage flux path begins fully saturated or only partially saturated. Further, the selection can be made such that the leakage magnetic flux path is not magnetized in the opposite direction. In this way, for a given motor configuration there is a window of potential voltage pulse magnitudes that provide a stark contrast between the positive voltage pulse and negative voltage pulse (for example in the resultant inductance, and therefore response currents). That is, a voltage pulse magnitude can be selected to create a high inductance over the whole range of starting flux density saturations for one of the negative/positive voltage pulses and a relatively low inductance for the other voltage pulse.

Figure 13A:
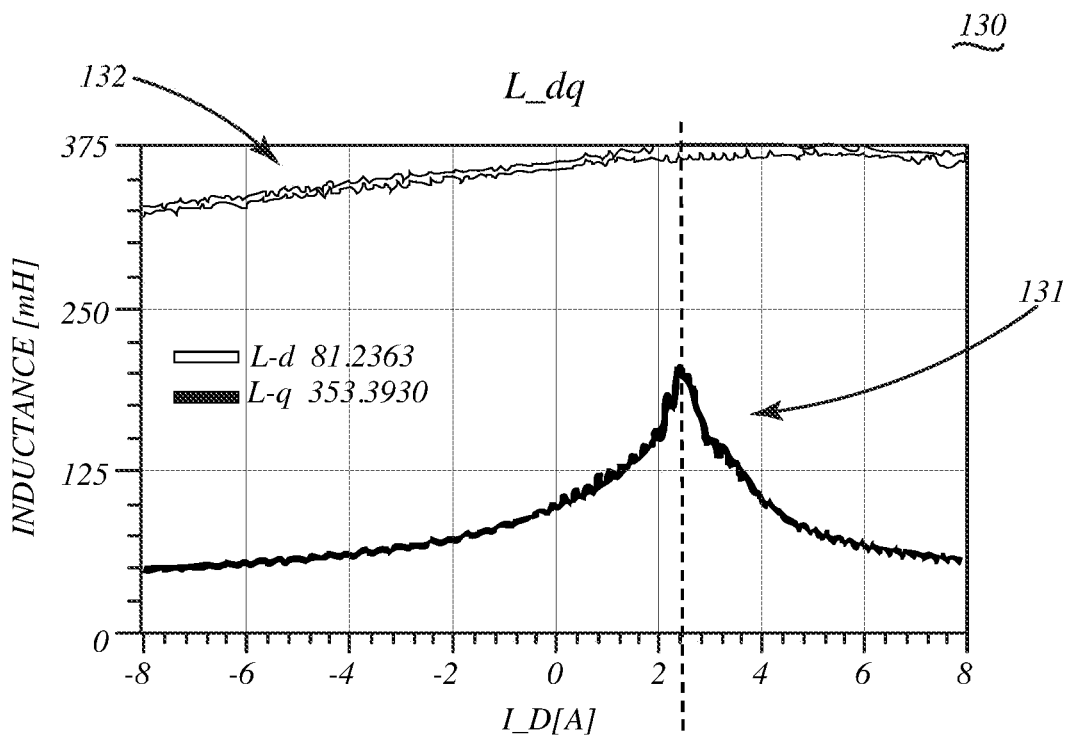
FIG. 13A illustrates the d-axis inductance change versus the d-axis current to reach the peak.

By characterizing a given PM-SyR motor, a particular magnitude of voltage pulse can be selected. Exemplary graphs such as FIGS. 13A-C can be helpful. Referring to FIG. 13A, in response to a d-axis current from −8.0 to 8.0 A being applied, stark variation of the d-axis inductance $L_d$ 131 can be seen. The d-axis inductance $L_d$ peaks at about 2.5 A, after that the d-axis inductance $L_d$, decreases back to the original value as the positive d-axis current increases above 2.5 A.

Figure 13B:
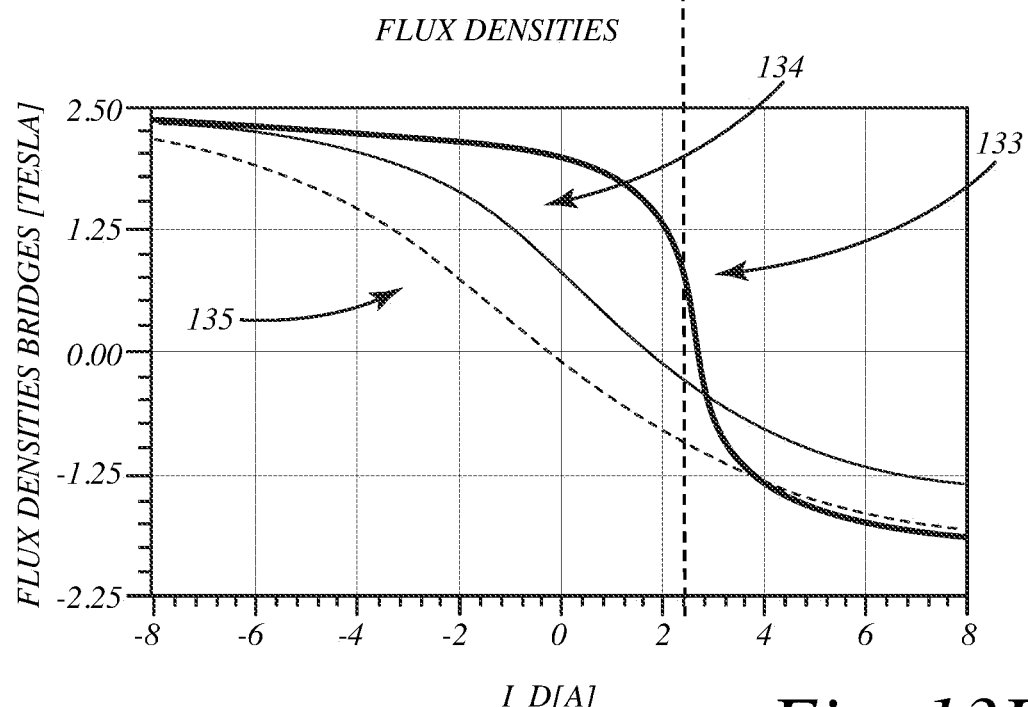
FIG. 13B shows the change of the flux densities in the bridges in accordance with the d-axis current.

FIG. 13B graphs the leakage flux at the three bridges as the d-axis current varies from −8 A to 8 A. As the flux density in bridge B1 decreases to zero, the d-axis inductance $L_d$, reaches its peak value. The inductance initially increases because the leakage flux path is being demagnetized due to the direction of the flux path. However, further increases past 2.5 A result in magnetizing the leakage flux path in the opposite direction, causing a reduction in d-axis inductance. Further, when a negative d-axis current is applied (e.g., 0 to −8), the d-axis inductance $L_d$ is quite linear because the leakage flux paths are saturated already.

Figure 13C:
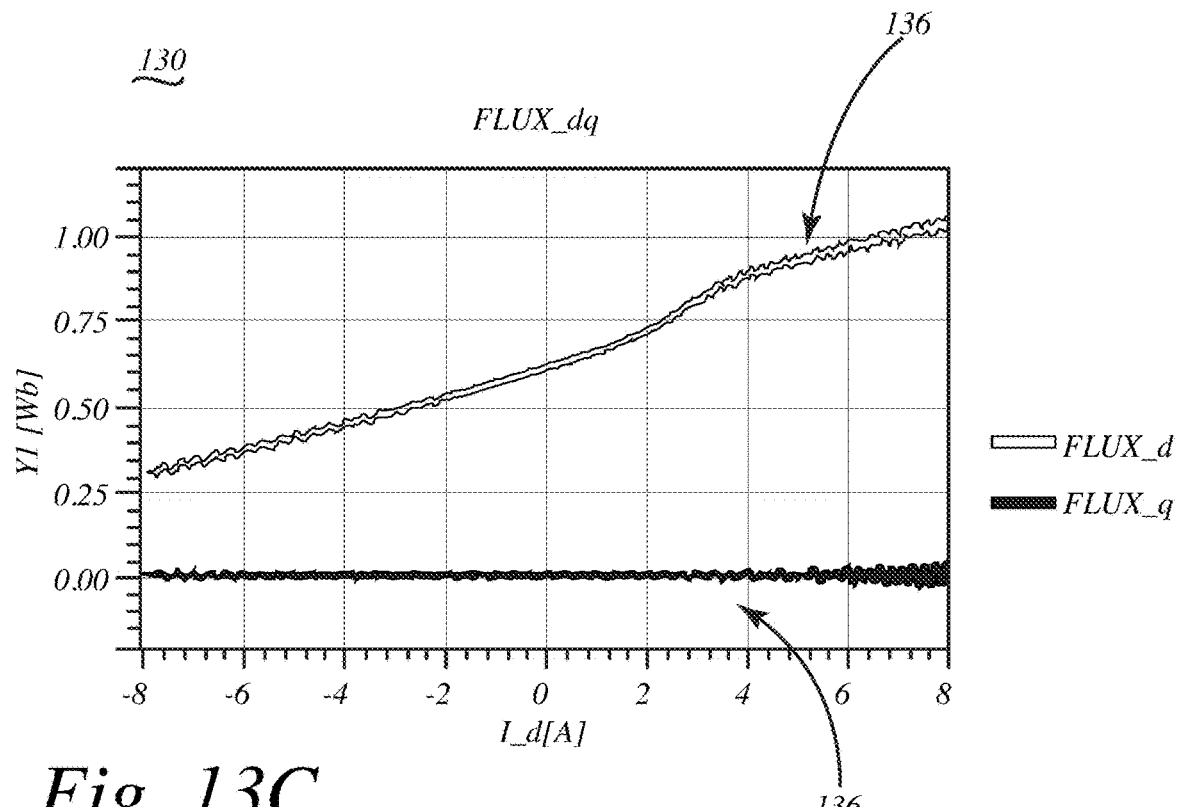
FIG. 13C illustrates the flux variation when the d-axis current changes.

FIG. 13C graphs the d-axis current versus magnetic flux in Webers. That is, FIG. 13 shows the magnetic flux curve when the d-axis current is applied in the whole range, showing the non-linear flux curve occurs within the d-axis current range from 1 to 4.0 A a limited current range. Outside of this d-axis current range (e.g., below 1.0 A and above 4.0 A), the curve is quite linear due to the non-saturate condition.

Consequently, when the d-axis voltage is applied and generates a response current $i_d$, considering the non-saturation or linear saturation in the main flux path, it is the leakage flux change in the bridges that dominates the d-axis inductance $L_d$, non-linear and rapid increasing in the positive direction, aligned with the d-axis direction, meanwhile, almost no change in the negative direction. This insight can be leveraged to enable detection of the difference of the current amplitudes when two voltage pulses are applied, $+V_{pulse}$ and $-V_{pulse}$.

One aspect of the current disclosure relates to selection of a magnitude of a positive voltage pulse and negative voltage pulse for exciting a stator of a sensorless permanent magnet assisted synchronous reluctance motor during startup polarity detection. The method includes characterizing surface bridge flux density over a range of positive and negative d-axis current values for a sensorless permanent magnet assisted synchronous reluctance motor having a particular configuration (e.g., ferrite, Ned-Fe—B, or rare earth permanent magnet configurations). The method includes identifying a d-axis current value and corresponding d-axis reflection current value where one demagnetize surface bridge flux density to maintain or achieve leakage flux magnetic desaturation, and the other magnetizes the surface bridge flux density to maintain or achieve leakage flux magnetic saturation. The d-axis current and its reflection can be utilized to select a voltage pulse magnitude for a polarity detection positive voltage and a negative voltage pulse such that one of the positive voltage pulse and the negative voltage pulse produces the d-axis current value and the other produces the identified corresponding d-axis reflection current value. This methodology of selecting a suitable magnitude of positive and negative voltage pulses can enable simple and efficient polarity detection for a PM-SyR motor.

Figure 14:
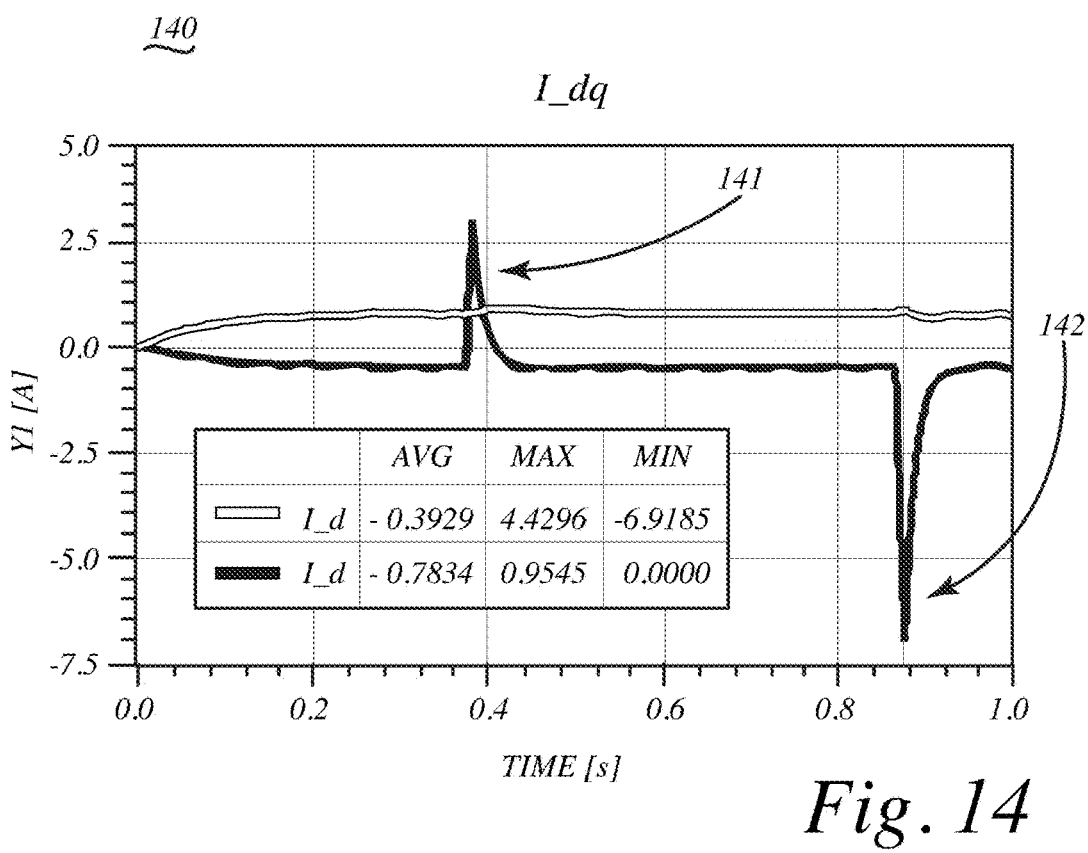
FIG. 14 illustrates a FEA simulation result showing current pulses for polarity detection.

FIG. 14 shows an exemplary FEA verification/result illustrating two d-axis current responses $I_{pulse1}$ 141 and $I_{pulse2}$ 142 when the two respective voltage pulses, $+V_{pulse}$ and $-V_{pulse}$ are applied. The current response difference is about 2.5 A and $I_{pulse1}$ is less than $I_{pulse2}$ meaning the d-axis does not need correction. If the current response were opposite (i.e., if $I_{pulse1}$ were greater than $I_{pulse2}$) then a correction factor would need to be applied to the d-axis current. The amount of the correction is 180 electrical degrees.

There are more factors that can affect polarity detection results. For example, the width of the bridges can affect the leakage flux amount and the d-axis inductance $L_d$ peak value. Such motor characteristics can be utilized to tailor the PM-SyR polarity detection method. That is, the expected responses (or difference in responses) of the two current responses $I_{pulse1}$ and $I_{pulse}$ can be adjusted to provide accurate polarity detection based on various characteristic of the PM-SyR motor.

III. HFI Polarity Detection Implementation Example for PM-SYR Motor

In the current exemplary embodiment, the Motor Under Testing (MUT) is a 2.2 kW ferrite-based PM-SyR motor driven by a direct flux control ("DFC") with high frequency injection ("HFI") control method. The digital controller uses a sampling frequency of 16 kHz. Since the supply inverter is fed from a single-phase rectifier at 220 Vac, the DC link voltage is 310 Vdc.

The following steps can inform selection of the volt-seconds for the positive and negative voltage pulses that are applied on the detected axis by the controller as well as other parameter selection.

Voltage Pulse Length Selection:

The length of the voltages' pulses can be selected as $$t_{pulse} = N_{pulses} \cdot T_s = \frac{N_{pulses}}{f_s} \qquad (6)$$

Where, $T_s$ is the sampling period, $f_s$ is the sampling frequency that was 16 kHz.

In one embodiment, The $N_{pulses}=30$, leading to a time length of voltages pulses equal to 1.9 ms.

Obtain the Current $I_D$ and Select Injected Flux a (Vs)

Ferrite PM-SyR motors have rotor bridge characteristics that can be leveraged for enhanced polarity detection. The nonlinearity due to the PM-SyR rotor bridge characteristics creates a reflection point below a certain d-axis current $i_d$.

Since the peak d-axis current is caused by the nonlinearity of the leakage flux path in the bridges, the difference value is limited by the capability of the leakage flux variation. That is, the d-axis current response to a positive voltage pulse is significantly different from the current response to a negative voltage pulse. Large current may not give more difference in the detection. A good option is to select the d-axis current above the current at the reflection point. At the MUT case, 2.5 A is selected as $I_d$ reference value. According to the analysis previously, the flux is selected as, $$A = 0.2(Vs) \qquad (7)$$

Selecting Voltage Pulse Amplitude $V_{Pulse}$

The voltage pulse amplitude can be selected based on equation (5). That is, it can be determined by a controller or set during configuration of the motor based on the voltage pulse timing and desired d-axis current. The voltage pulse amplitude can also take inverter dead-time effects into account, for example with the following formula:

$$V_{pulse} = \frac{A}{N_{pulse}} \cdot f_s + \max(v_{dead\,time}) \qquad (8)$$

where A=0.2 (Vs), $N_{pulse}=30$, $f_s=16$ kHz, while the maximum inverter dead-time can be computed from a Look-Up Table (LUT) mapping the dead-time effect.

$$\max(v_{dead\,time}) = \text{dt\_error\_vector}[\text{dt\_points} - 1] \cdot v_{dc} \qquad (9)$$

Where, dt_error_vector[ ] is a vector containing the dead-time error (pu) with respect to the DC-link voltage, dt_points is the size of this vector.

For this MUT specific implementation, the magnitude of $V_{pulse}$ is about 70V. The controller can generate or load $V_{pulse}$ and characteristics thereof during motor initialization or startup.

Select HFI Frequency and Voltage

The selected frequency can be a submultiple of the sampling frequency, as the generation of the cos $(\omega_h t)$ used for HFI voltage generation is to be performed synchronously with the sampling frequency. In addition, the submultiple number can be an even number. For example, the selected frequency can be chosen as 500 Hz (32 samples for one high frequency period).

In one exemplary embodiment, the Motor Under Test (MUT) is a 2.2 kW, PM-SyR motor with the inductances:

$$L_{dh} = 52 \text{ mH} \qquad (10)$$

$$L_{qh} = 290 \text{ mH}$$

For the injected frequency of 500 Hz, the HF d-axis reactance is, $$X_{dh} = 2 \cdot \pi \cdot f_h \cdot L_{dh} = 2 \cdot \pi \cdot 500 \cdot 0.052 = 163.3\Omega \qquad (11)$$

The MUT stator resistance is 3.2Ω at an ambient 25° C., so the stator resistance is much smaller than the d-axis HF reactance.

For the MUT, the HFI voltage is chosen as 60V, so the peak values of the d-axis current is, $$\hat{I}_{dh} \cong \frac{V_h}{X_{dh}} = \frac{60}{163.3} \cong 0.4 \text{ A} \qquad (12)$$

Track Loop PI Controller Gains

The proportional-integral ("PI") gains of an HFI tracking loop are well understood in the art. For the MUT in this example, the same gains have been used as for a bandwidth of about 25 Hz:

$$k_{p,HF} = 150\left(\frac{\text{rad}}{\text{s}}\right) \qquad (13)$$

-continued $$k_{i,HF} = 4300\left(\frac{\text{rad}}{\text{s}^2}\right) \quad (14)$$

The MUT 2.2 kW PM-SyR motor can be tested on a test rig. As the focus is on the polarity detection, the MUT can be tested at no-load with starting from standstill to 1,000 RPM. The results are presented in FIGS. 15-17.

Figure 15A:
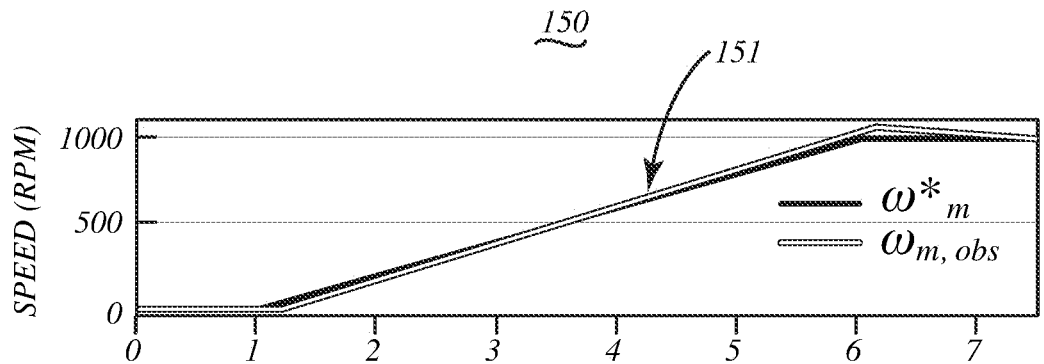
FIGS. 15A-C illustrate the testing result of the entire starting process from zero speed to the target speed.
Figure 15B:
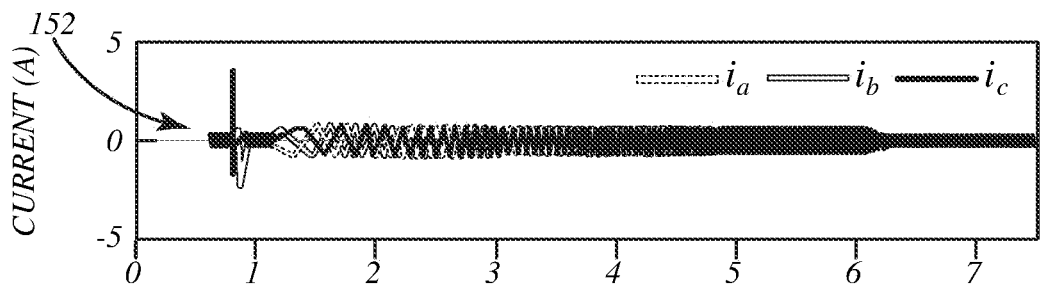
Figure 15C:
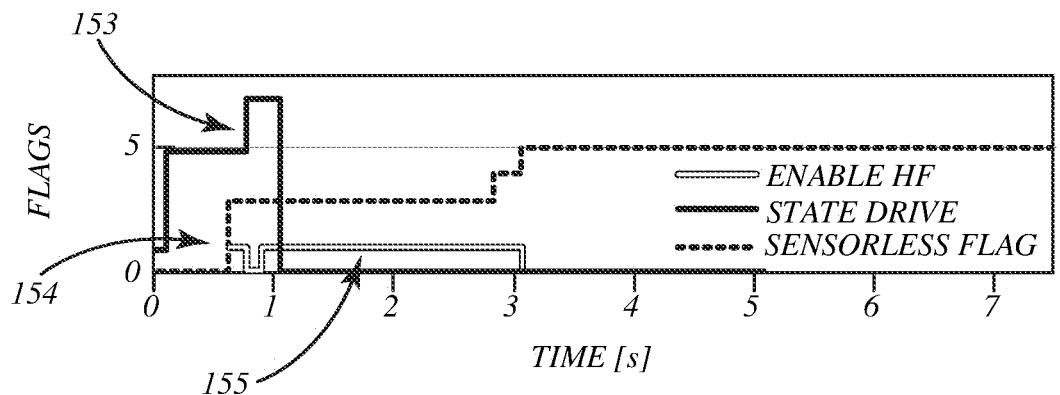

FIG. 15A shows the speed command and the actual speed 151 to follow the command speed. FIG. 15B is the stator phased current $i_a$, $i_b$ and $i_c$ waveforms 152 in real time during the starting process. FIG. 15C shows the control variable status updates. In the MUT case, $I_{pulse1} < I_{pulse2}$, presents the reference and estimated speed, the motor currents, and the different control flags 153, 154, and 155 used by the sensorless control. The speed values used for the transition from HFI, and linear observer have been set at 350 rpm and 400 rpm, respectively. For more details, see U.S. Pat. No. 10,819,264 B1 to Bojoi et al., granted on Oct. 27, 2020, entitled "ROBUST STARTING SYSTEM AND METHOD FOR INTERIOR PERMANENT MAGNET SYNCHRONOUS MOTOR CONTROL", which was previously incorporated by reference.

Figure 16A:
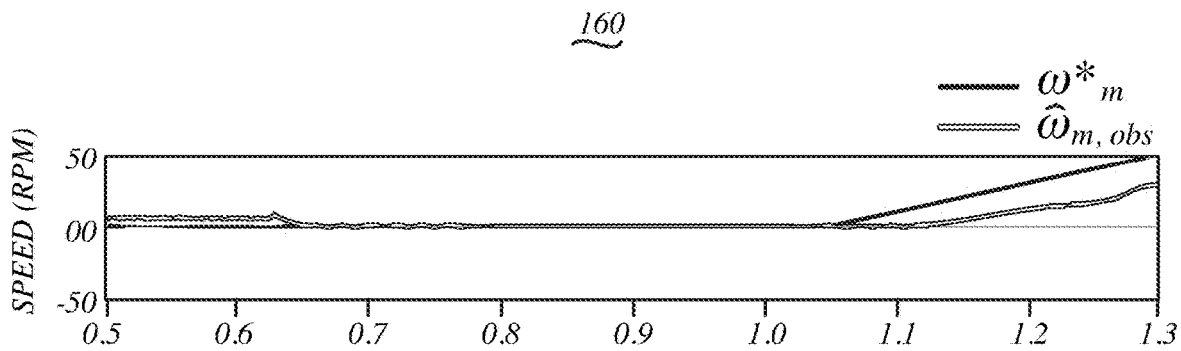
FIGS. 16A-D illustrate zoom-in outputs in a starting process.
Figure 16B:
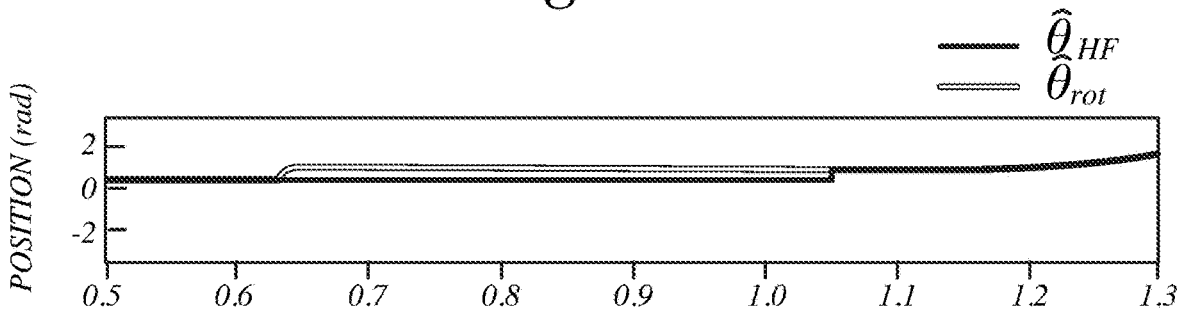
Figure 16C:
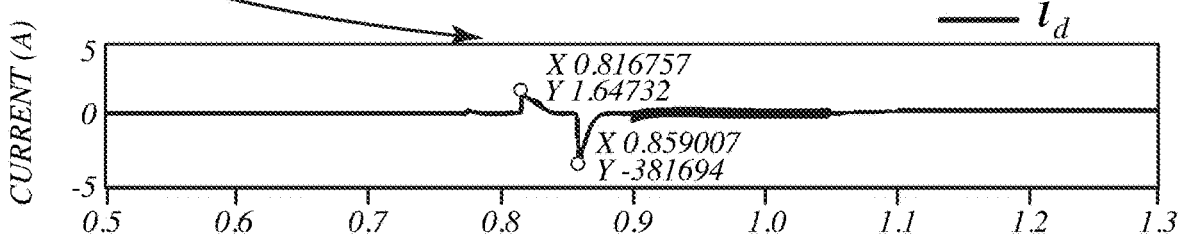
Figure 16D:
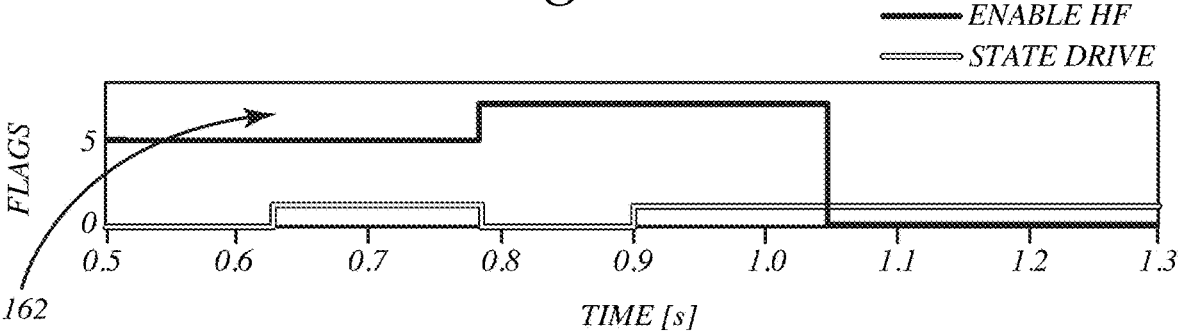
Figure 17A:
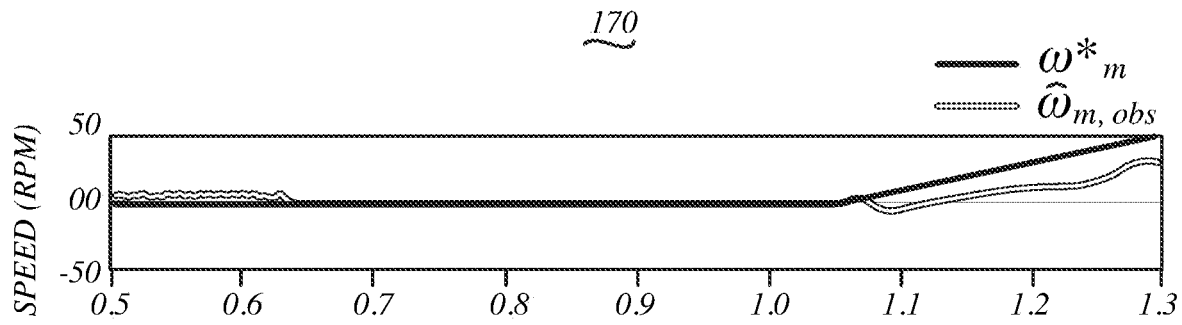
FIGS. 17A-D illustrate rotor polarity detection process with a reverse alignment to the d-axis.
Figure 17B:
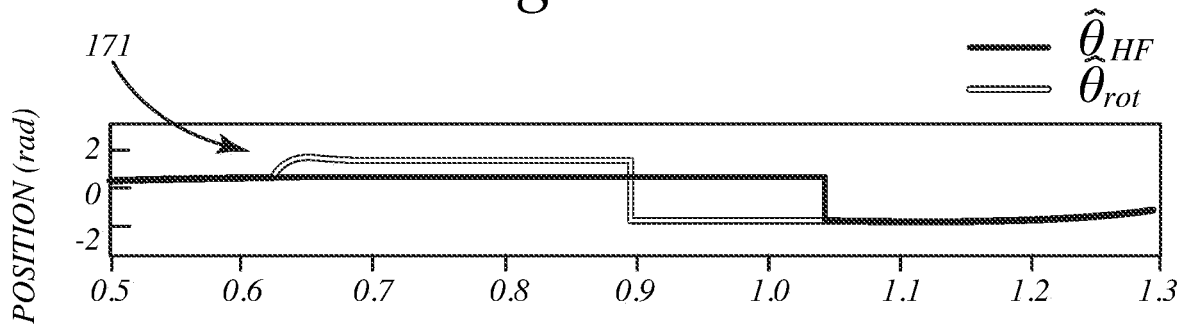
Figure 17C:
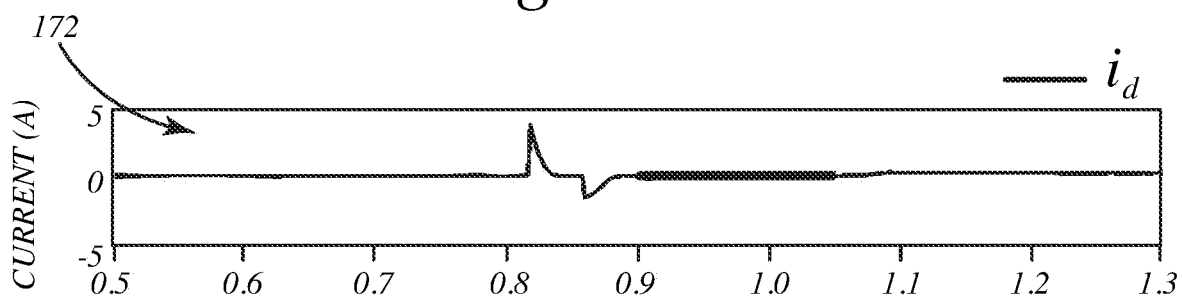
Figure 17D:
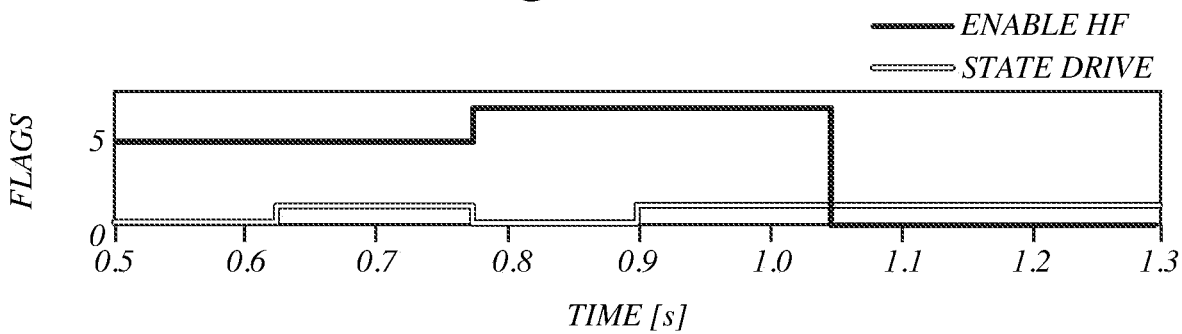

FIGS. 16A-D illustrate an exemplary startup period for a motor utilizing a PM-SyR startup control in accordance with the present disclosure. Referring to FIG. 16C, during magnetic polarity detection 162 the positive current pulse has a peak value of 1.65 A and the negative current pulse has a peak value of −3.81 A. As a result, the PM-SyR HFI polarity detection method detects properly the d-axis of the MUT. In FIG. 16B, the position signal curve is flat (because no change was necessary due to the PM-SyR HFI polarity detection method). On the contrary, FIG. 17 shows a starting case for which the positive current pulse has a higher peak value than the negative current pulse. As a result, the estimated angle is corrected by 180 electrical degrees, as shown in FIG. 17B.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A sensorless permanent magnet assisted synchronous reluctance motor comprising:
   a stator mounted having a three-phase stator winding configuration;
   a rotor including a magnetic permeability core having a plurality of flux barriers that divide the core into a plurality of main rotor flux path segments to control flow of magnetic flux within the rotor, wherein the plurality of flux barriers hold a plurality of permanent magnets, the magnetic permeability core including a plurality of surface bridges that join the plurality of rotor flux path segments together, the rotor being rotatable relative to the stator via excitation of the three-phase stator winding configuration of the stator, wherein the plurality of permanent magnets generate a plurality of rotor magnetic poles having magnetic polarity;
   a main magnetic flux path between at least one of the plurality of rotor flux path segments and the stator;
   an unloaded leakage magnetic flux path through at least one of the plurality of surface bridges having a directionally magnetized flux density caused by at least one of the plurality of permanent magnets;
   a motor control system configured to detect at least one of rotor position, rotor speed, and rotor magnetic polarity, based on a variation of inductance caused by the leakage magnetic flux path through the at least one of the plurality of surface bridges.

2. The sensorless permanent magnet assisted synchronous reluctance motor of claim 1 wherein the magnetic permeability core includes a plurality of inner bridges that join the plurality of rotor flux path segments together to increase mechanical integrity of the rotor.

3. The sensorless permanent magnet assisted synchronous reluctance motor of claim 1 wherein the plurality of permanent magnets include at least one of a plurality of ferrite magnets, a plurality of Nedium magnets, and a plurality of rare earth magnets.

4. The sensorless permanent magnet assisted synchronous reluctance motor of claim 1 wherein the plurality of flux barriers are configured with slots for the magnets for positioning the magnets within the barriers.

5. The sensorless permanent magnet assisted synchronous reluctance motor of claim 1 wherein the motor control desaturates directionally magnetized flux density in the at least one of the plurality of surface bridges without substantially directionally saturating the leakage magnetic flux path through the at least one of the plurality of surface bridges in an opposite direction of the directionally magnetized flux density in the unloaded leakage magnetic flux path.

6. A method for determining magnetic polarity of a sensorless permanent magnet assisted synchronous reluctance motor, wherein the sensorless permanent magnet assisted synchronous reluctance motor includes a stator having a three-phase stator winding configuration and a rotor including a magnetic permeability core having a plurality of flux barriers that hold a plurality of permanent magnets and a plurality of surface bridges, wherein the plurality of permanent magnets generate a plurality of rotor magnetic poles having magnetic polarity, the method for determining magnetic polarity comprising:

demagnetizing directionally magnetized flux density in a first one of the plurality of surface bridges, and further magnetizing the flux density in a second one of the plurality of surface bridges;

applying positive and negative voltage pulses to the three-phase stator winding configuration of the rotor;

detecting a current response to the positive voltage pulse;

detecting a current response to the negative voltage pulse;

determining the magnetic polarity of the plurality of magnetic poles based on the current response to the positive voltage pulse and the current response to the negative voltage pulse.

7. The method for determining magnetic polarity of a sensorless permanent magnet assisted synchronous reluctance motor of claim 6 wherein the current response to one of the positive voltage pulse and the negative voltage pulse is a current response in the d-axis direction and the current response to the other of the positive voltage pulse and the negative voltage pulse is a current response in the negative d-axis direction.

8. The method for determining magnetic polarity of a sensorless permanent magnet assisted synchronous reluctance motor of claim 6 wherein the plurality of permanent magnets include at least one of a plurality of ferrite magnets, a plurality of Nedium magnets, and a plurality of rare earth magnets.

9. The method for determining magnetic polarity of a sensorless permanent magnet assisted synchronous reluctance motor of claim 6 including selecting a magnitude of a positive voltage pulse and a negative voltage pulse such that one of the positive voltage pulse and the negative voltage pulse desaturates the directionally magnetized flux density in the at least one of the plurality of surface bridges without substantially saturating the leakage magnetic flux path through the at least one of the plurality of surface bridges in an opposite direction of the directionally magnetized flux density in the unloaded leakage magnetic flux path.

10. The method for determining magnetic polarity of a sensorless permanent magnet assisted synchronous reluctance motor of claim 9 wherein selecting the magnitude of the positive voltage pulse and negative voltage pulse includes selecting the magnitude of the positive voltage pulse and negative voltage pulse such that one of the positive voltage pulse and the negative voltage pulse desaturates the directionally magnetized flux density in the at least one of the plurality of surface bridges to about zero Tesla.

11. The method for determining magnetic polarity of a sensorless permanent magnet assisted synchronous reluctance motor of claim 9 wherein selecting the magnitude of the positive voltage pulse and negative voltage pulse includes selecting the magnitude of the positive voltage pulse and negative voltage pulse based on characteristics of the sensorless permanent magnet assisted synchronous reluctance motor such that a threshold difference in d-axis inductance is generated in response to the positive and negative voltage pulses.

12. The method for determining magnetic polarity of a sensorless permanent magnet assisted synchronous reluctance motor of claim 6 including detecting rotor position during a starting moment to obtain a starting moment motor position and positions of the plurality of rotor magnetic poles having unknown magnetic polarity.

13. The method for determining magnetic polarity of a sensorless permanent magnet assisted synchronous reluctance motor of claim 6 including detecting low speed rotor movement during a starting moment and positions of the plurality of rotor magnetic poles having unknown magnetic polarity by accounting for low speed rotor movement with the detected low speed rotor movement.

14. A method for exciting a stator of a sensorless permanent magnet assisted synchronous reluctance motor during startup, wherein the sensorless permanent magnet assisted synchronous reluctance motor includes a stator having a three-phase stator winding configuration and a rotor including a magnetic permeability core having a plurality of flux barriers that hold a plurality of permanent magnets and a plurality of surface bridges, wherein the plurality of permanent magnets generate a plurality of rotor magnetic poles having magnetic polarity, the method for determining magnetic polarity comprising:

characterizing surface bridge flux density over a range of positive and negative d-axis current values for a sensorless permanent magnet assisted synchronous reluctance motor having a particular configuration;

identifying a d-axis current value and corresponding d-axis reflection current value, wherein the d-axis current value demagnetize the surface bridge flux density to maintain or achieve leakage flux magnetic desaturation, and wherein the corresponding d-axis reflection current value magnetize the surface bridge flux density to maintain or achieve leakage flux magnetic saturation;

selecting a pair of polarity detection voltage pulses such that one of the polarity detection voltage pulses produces the identified d-axis current value that that demagnetizes the surface bridge flux density and the other one of the polarity detection voltage pulses produces the identified corresponding d-axis reflection current value that magnetizes the surface bridge flux density.

15. The method for exciting a stator of a sensorless permanent magnet assisted synchronous reluctance motor during startup polarity detection of claim 14, wherein the identifying the d-axis current value and corresponding d-axis reflection current value includes identifying a range of d-axis current values and corresponding d-axis reflection current values, wherein the d-axis current values demagnetize the surface bridge flux density to maintain or achieve leakage flux magnetic desaturation, and wherein the corresponding d-axis reflection current values magnetize the surface bridge flux density to maintain or achieve leakage flux magnetic saturation.

16. The method for exciting a stator of a sensorless permanent magnet assisted synchronous reluctance motor during startup polarity detection of claim 14, wherein the characterizing surface bridge flux density includes characterizing surface bridge flux density over a range of positive and negative d-axis current values for a sensorless permanent magnet assisted synchronous reluctance motor for a plurality of different rotor positions;

wherein the identifying the range of d-axis current values and corresponding d-axis reflection current values includes identifying the range of d-axis current values and corresponding d-axis reflection current values at a plurality of different rotor positions.

17. The method for exciting a stator of a sensorless permanent magnet assisted synchronous reluctance motor during startup polarity detection of claim 14 wherein the particular motor configuration includes a four pole permanent ferrite magnet synchronous reluctance motor configuration.

18. The method for exciting a stator of a sensorless permanent magnet assisted synchronous reluctance motor during startup polarity detection of claim 14 wherein the particular motor configuration includes a four pole permanent rare earth magnet synchronous reluctance motor configuration.

19. The method for exciting a stator of a sensorless permanent magnet assisted synchronous reluctance motor during startup polarity detection of claim 14 wherein the particular motor configuration includes a four pole permanent Ned-Fe—B magnet synchronous reluctance motor configuration.

\* \* \* \* \*